United States Patent
Sharma et al.

(10) Patent No.: US 10,872,142 B1
(45) Date of Patent: Dec. 22, 2020

(54) LOCALIZED IDENTITY MANAGEMENT IN LIMITED COMMUNICATION NETWORKS

(71) Applicant: Amazon Technologies, Inc., Seattle, WA (US)

(72) Inventors: Rahul Sharma, Seattle, WA (US); Sanjeev Krishnan, Bangalore (IN); Timothy Wells Hunt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 156 days.

(21) Appl. No.: 15/910,873

(22) Filed: Mar. 2, 2018

(51) Int. Cl.
*H04L 29/06* (2006.01)
*G06F 21/44* (2013.01)
*G06F 21/34* (2013.01)
*H04L 12/24* (2006.01)

(52) U.S. Cl.
CPC .............. *G06F 21/44* (2013.01); *G06F 21/34* (2013.01); *H04L 41/28* (2013.01)

(58) Field of Classification Search
CPC ........... G06F 21/44; G06F 21/34; H04L 41/28
See application file for complete search history.

(56) References Cited

U.S. PATENT DOCUMENTS

| | | | | |
|---|---|---|---|---|
| 6,941,472 B2* | 9/2005 | Moriconi | .............. | G06F 21/552 707/999.009 |
| 9,660,985 B2* | 5/2017 | Cao | .................... | H04L 63/0853 |
| 9,742,767 B1* | 8/2017 | Li | .................... | H04L 63/0884 |
| 10,050,787 B1* | 8/2018 | Johansson | ............. | H04L 9/0866 |
| 2001/0034704 A1 | 10/2001 | Farhat et al. | | |
| 2002/0053032 A1 | 5/2002 | Dowling et al. | | |
| 2007/0283447 A1* | 12/2007 | Hong | ..................... | G06F 21/34 726/28 |
| 2014/0223518 A1* | 8/2014 | Feng | .................. | H04L 63/0823 726/4 |
| 2014/0229339 A1* | 8/2014 | Massiere | ............ | G06Q 20/3229 705/26.81 |
| 2014/0282895 A1* | 9/2014 | Stuntebeck | ............. | G06F 21/34 726/4 |
| 2015/0046989 A1* | 2/2015 | Oberheide | .............. | G06F 21/44 726/6 |
| 2016/0139573 A1* | 5/2016 | Soni | ........................ | H04L 63/10 700/275 |
| 2016/0182525 A1* | 6/2016 | Zhu | ........................ | H04L 63/083 726/1 |
| 2016/0259936 A1* | 9/2016 | Mukherjee | .............. | G06F 21/45 |

(Continued)

*Primary Examiner* — Ghodrat Jamshidi
(74) *Attorney, Agent, or Firm* — Knobbe, Martens, Olson & Bear, LLP

(57) ABSTRACT

Systems and methods are described for management of data transmitted between computing devices in a communication network. An administrative component can configure one or more devices in the communication path of messages to be exchanged by devices to interpret codes embedded in the communication messages. A receiving device can review incoming messages for one or more processing codes or instructions that are embedded in the portion of the communication typically utilized solely to identify the subject matter of the communication, generally referred to as the topic portion of the communication. The receiving devices can then process the embedded codes to determine how the communication message will be routed or otherwise processed.

22 Claims, 12 Drawing Sheets

(56) References Cited

U.S. PATENT DOCUMENTS

| | | | |
|---|---|---|---|
| 2016/0292694 A1* | 10/2016 | Goldschlag | H04L 63/20 |
| 2016/0342784 A1* | 11/2016 | Beveridge | H04L 67/08 |
| 2016/0345170 A1* | 11/2016 | Mann | H04W 12/04031 |
| 2017/0012967 A1 | 1/2017 | Holloway et al. | |
| 2017/0019396 A1* | 1/2017 | Bettenburg | G06F 21/34 |
| 2017/0171172 A1 | 6/2017 | Sullivan et al. | |
| 2017/0201392 A1 | 7/2017 | Ahn et al. | |
| 2017/0270131 A1* | 9/2017 | Bregman | H04L 41/28 |
| 2018/0041503 A1* | 2/2018 | Lindemann | H04L 63/0435 |
| 2019/0075458 A1* | 3/2019 | Kulakowski | G06F 21/313 |
| 2019/0228144 A1* | 7/2019 | Kermes | G06F 21/44 |

\* cited by examiner

LOCALIZED IDENTITY MANAGEMENT IN LIMITED COMMUNICATION NETWORKS

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some environments, the computing devices that communicate via the communication network can correspond to devices having a primary function as a computing device, such as a desktop personal computer. In other environments, at least some portion of the computing devices that communicate via the communication network can correspond to embedded devices or thin devices that have at least one alternative primary function, such as household appliances having a separate primary purpose (e.g., a thermostat or refrigerator) while also providing at least limited computing functionality. In some instances, the local user interfaces of these embedded devices or thin devices are limited, and thus remote management may be required to implement some functions of these devices. However, remote management can in some instances be problematic, due to latency in communications with a remote management device and potential for private information to be inadvertently disclosed either at the remote management device or during communications with the remote management device. These issues may be more prevalent when the embedded devices or thin devices and the remote management device exist on separate communication networks or communicate over public communications networks.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
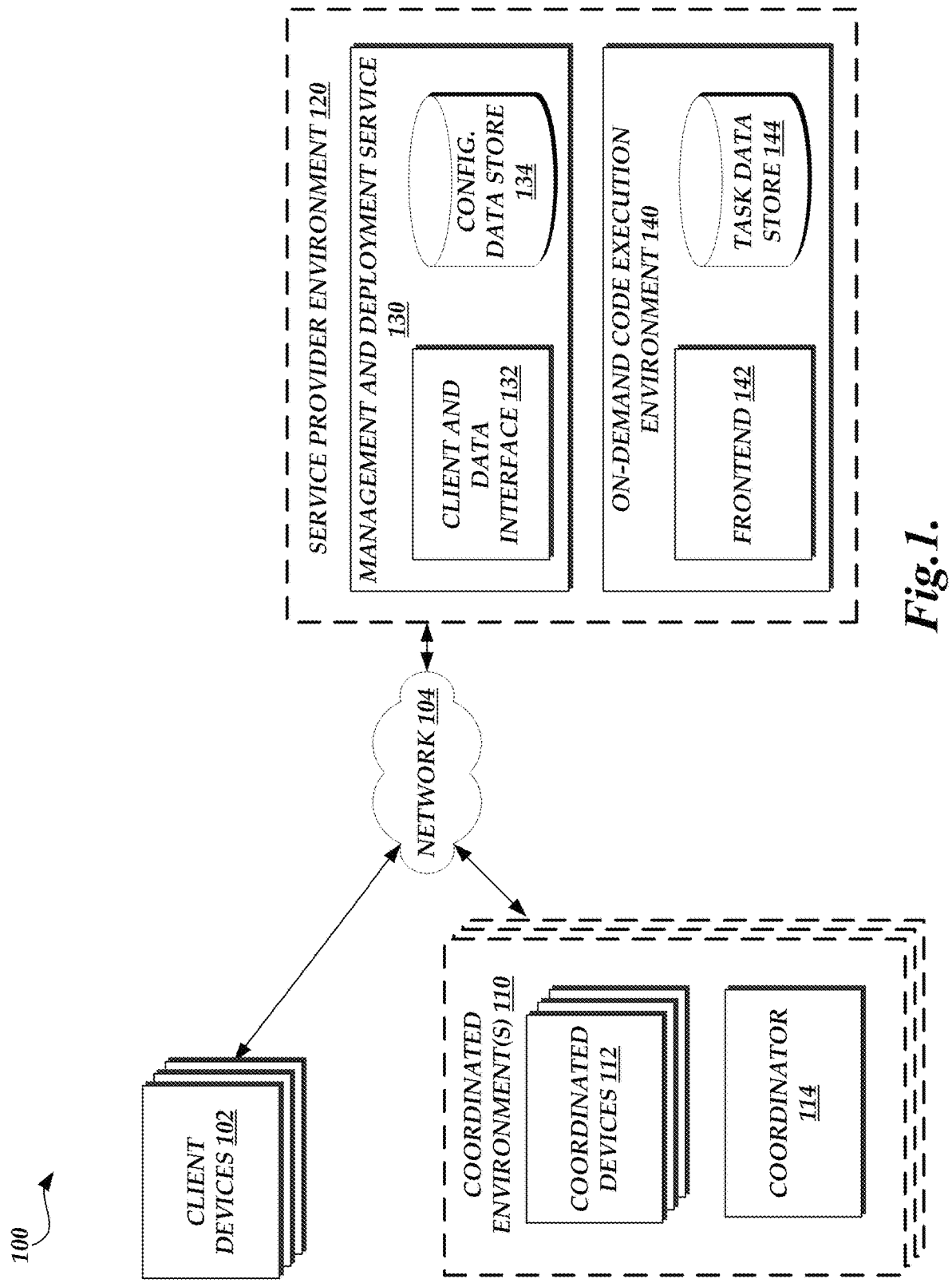
FIG. 1 is a block diagram depicting an illustrative environment in which a coordinator can operate to locally manage and coordinate operation of coordinated devices within a coordinated environment, and wherein the coordinator may communicate with client devices and a service provider environment to modify operation of the coordinator.

Generally described, the present application corresponds to the management of computing devices in a communication network. More specifically, aspects of the present application correspond to management of authentication and authorization information related to access of client computing devices, such as IoT devices. Illustratively, one or more computing devices can be associated with local resources that can be accessed by one or more users. In some implementations, the computing devices may be implemented in environments, such as construction sites, corporate offices, medical offices/buildings, etc., in which access to the computing devices or computing device resources is intended to be governed by authorization or authentication information. By way of example, authorization or authentication information can be in the form of electronic tokens which can be used to govern access to the computing device or computing device resource(s) and policies regarding use of the computing device.

Generally described, traditional management of authorization or authentication of computing devices can be managed by network-based services that receive requests to access computing devices or computing devices resources. Such network-based services can utilize network-maintained authorization and authentication information to process the request and generate a process result, such as electronic tokens. In return, one or more users can be authenticated and the computing device or computing device resources can be configured for use by individual users. However, for computing devices in environments in which network connectivity may be more limited or periodically unavailable, management of network-based authentication and authorization can become deficient. For example, IoT devices may be utilized in industrial environments in which accessing external networks during operation may be operationally disabled for compliance and regulatory purposes. In such embodiments, users may not be able to access computing devices or computing devices resources without the specific authorization and authentication information.

In accordance with aspects of the present disclosure, a system for processing requests for authentication or authorization can be facilitated in the context of a coordinator present within a coordinated environment to control operation and functionality of coordinated devices within the coordinated environment. In some instances, coordinated devices may correspond to embedded devices or thin devices that have at least one alternative primary function, such as household appliances having a separate primary purpose. Such devices may in some instances be referred to as "Internet-of-Things" devices, or "IoT" devices. Coordinated devices may include limited local user interface capabilities, and may thus benefit from remote management. Illustratively, the coordinated devices or client computing devices have local resources that can be accessed or otherwise facilitate access based on the use of authorization or authentication information.

The coordinator disclosed herein enables such remote management of coordinated devices locally, within an environment including the coordinator and the coordinated devices (such as a local area network, or "LAN," environment). In some embodiments and as will be described below, use of a coordinator can thus enable management of coordinated devices without requiring communications external to the local environment, thereby allowing a reduction in security and data privacy risks and an increase in communication speed over the use of external or public communication networks. Further, a coordinator as disclosed herein may function as a localized on-demand code execution system, enabling rapid execution of portable segments of code to implement functions on the coordinator, such as the processing of request to access resources associated with coordinated devices. These portable segments of code may be referred to herein as "tasks." In some instances, tasks may be utilized to coordinate functionality of a coordinated device, such as by changing the state of the device. For example, where a coordinated device is a network-enabled light, a task may function to change the state of the light (e.g., to "on" or "off") according to an input to the coordinator, such as the current time, a user input, or the state of another coordinated device. The coordinator may further enable communication coordinated devices and tasks according to a number of different protocols, and in some instances, provide translation functions between such protocols.

Still further, the coordinator may in some instances manage an execution location of a task, such that the task may be executed on the coordinator, on a coordinated device, or on a device of a remote network environment (e.g., a remote network computing environment), according to capabilities of candidate devices and requirements for execution of the task. These tasks may in some instances be user-defined, enabling users to implement a variety of functionalities on the coordinator or coordinated devices, according to user-submitted code corresponding to the task. Thus, a coordinator may provide rapidly reconfigurable localized management of coordinated devices.

In accordance with embodiments of the present disclosure, a coordinator may be associated with a network-based service that is instantiated on one or more components on the edge nodes of the service, which is different from a centralized authentication and authorization service. Illustratively, the service provider environment may be operated by a provider of the coordinator, and enable a user to specify various configuration parameters of the coordinator, such as the location of a coordinated environment for the coordinator, the coordinated devices within the environment, the tasks executable by a coordinator, how the coordinator should manage communications between devices, between tasks, or between devices and tasks, security information for the coordinator, or other parameters of the coordinator (such as metrics to be monitored at a coordinator or logging to be conducted at the coordinator). Because the coordinator itself may in some instances be associated with limited localized user interfaces, the service provider environment by enable a user, via a client device, to submit a configuration for the coordinator, and to cause the coordinator to be automatically provisioned with the configuration. The service provider environment may further enable a single client device to manage multiple coordinators via a unified interface, and to quickly alter the configuration of a coordinator by deploying a new configuration, or by rolling-back or undoing prior deployments of configurations to the coordinator.

In some instances, the service provider environment may provide functionalities similar or identical to the functionalities of the coordinator. For example, a coordinator may function at least in part based on execution of portable segments of code, or "tasks." Similarly, a server provider environment may include an on-demand code execution environment that functions to execute the same or similar tasks. Further details regarding such an on-demand code execution environment can be found within U.S. Pat. No. 9,323,556, entitled PROGRAMMATIC EVENT DETECTION AND MESSAGE GENERATION FOR REQUESTS TO EXECUTE PROGRAM CODE and filed Sep. 30, 2014 ("the '556 Patent"), the entirety of which is hereby incorporated by reference. In brief, to execute tasks, an on-demand code execution environment may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels.

Illustratively, the on-demand code execution environment may maintain a pool of virtual machine instances on one or more physical computing devices, where each virtual machine instance has one or more software components (e.g., operating systems, language runtimes, libraries, etc.) loaded thereon. When the on-demand code execution environment receives a request to execute the program code of a user (a "task"), which specifies one or more computing constraints for executing the program code of the user, the on-demand code execution environment may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution environment may include a virtual machine instance manager, as described in more detail in the '556 Patent, that is configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in the '556 Patent.

As discussed above, the coordinator may in some instances be configured to select whether to execute tasks locally (e.g., on the coordinator) or by use of an on-demand code execution environment within a service provider network. For example, the coordinator may function as the processing service operable to evaluate requests for authentication and authorization of requests. In such instances, the coordinator may function to generate processing results based on the evaluation of the authentication and authorization information. Although illustratively described with regard to the execution of tasks, as described herein, such aspects of the present application are not necessarily limited to implementation requiring the execution of tasks or a task-execution environment.

In accordance with still further aspects of the present application, the service provider network can further include multiple points of presences, POPs, that are instantiated at different logical or geographic regions. Illustratively, the points of presence, often referred to as edge devices, can be configured to function as the processing service operable to evaluate requests for authentication and authorization of requests. In such instances, the coordinator may function to generate processing results based one evaluation of the authentication and authorization information.

Although aspects of some embodiments described in the disclosure will focus, for the purpose of illustration, on processing authentication and authorization information and generating processing results, one skilled in the relevant art will appreciate that the examples are illustrative only and are not necessarily intended to be limiting. As will be appreciated by one of skill in the art in light of the present disclosure, the embodiments disclosed herein improves the ability of computing systems, and particularly computing systems with limited localized user interfaces, to be coordinated and managed by an external device.

The foregoing aspects and many of the attendant advantages of this disclosure will become more readily appreciated as the same become better understood by reference to the following description, when taken in conjunction with the accompanying drawings. Various embodiments and aspects of the present application will be described with regard to FIGS. 1-8. Nothing in the present application should be interpreted in a manner that requires any specific combination of embodiments or examples. Additionally, one skilled in the relevant art will appreciate that one or more aspects or embodiments of the present application may be readily combined and can result in additional inventive aspects of the present application.

FIG. 1 is a block diagram of an illustrative operating environment 100, including one or more coordinated environments 110 in which a coordinator 114 may operate to control coordinated devices 112, as well client devices 102 that may interact with the coordinated environments 110 (e.g., to request a change in state of a coordinated device 112), and a service provider environment 120 that may assist in communications with or configuration of the coordinators 114 in various coordinated environments 110.

The coordinated environments 110, client devices, and service provider environment 120 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), MQTT, Constrained Application Protocol (CoAP), and the like. Protocols and components for communicating via the Internet or any of the other aforementioned types of communication networks are well known to those skilled in the art and, thus, are not described in more detail herein. Although all of the components of the network 104 are illustrated in FIG. 1, one or more of the components, such as routers may function as a message processing service.

Each coordinated environment 110 may include a coordinator 114 and any number of coordinated devices 112, in communication via a network of the execution environment 110 (which network is not shown in FIG. 1). Because of their association within the coordinated environment 110, the coordinated devices 112 and coordinator 114 within a given environment 110 may be considered "local" to one another, in terms of communications network. For example, the coordinated devices 112 and coordinator 114 within a given environment 110 may be connected via a LAN or other localized communication network.

Each coordinated device 112 can correspond to a computing device configured to communicate with the coordinator 114 to manage functionality of the coordinated device 112. In some instances, coordinated devices 112 can correspond to fully featured computing devices, such as laptops, desktops, standalone media players, etc., with robust localized user interface capabilities. In other instances, coordinated devices 112 can correspond to thin devices or embedded devices associated with another primary function, such as an device embedded within or attached as an accessory to a household appliance or device (such as a refrigerator, washing machine, hot water heater, furnace, door lock, light bulb, electrical outlet, electrical switch, etc.). Such appliances or devices are in some contexts referred to as "smart" devices, IoT devices, or "connected" devices. As such, the coordinated devices 112 may include limited local user interfaces, and be configured for remote management. In some instances, coordinated devices 112 may be stateful, and operate to alter their state in response to instructions (e.g., by turning from "off" to "on," etc.).

As described in more detail below (e.g., with respect to FIG. 2), the coordinator 114 can correspond to a computing device executing instructions to coordinate, manage, or control operation of the coordinated devices 112, without requiring that instructions transmitted to the coordinated devices 112 travel outside the coordinated environments 110 (thus increase the security of such instructions and increasing the speed of their transmission). Specifically, the coordinator 114 can include a processor and memory collectively configured to manage communications between any combination of coordinated devices 112, client devices 102, and devices of the service provider network 120. The coordinator can further be configured to enable executions of tasks, in a manner similar to an on-demand code execution environment 120 of the service provider environment 120. These tasks may implement a variety of user-defined or non-user-defined functionalities, including communicating with coordinated devices 112, client devices 102, and devices of the service provider network 120. As such, the coordinator 114 can be configured to allow for manual, automatic, or semi-automatic control of coordinated devices 112. For example, the coordinator 114 may enable a client device 102 to transmit a request to change the state of a coordinated device 112, and cause such a change in state to occur. As a further example, the coordinator 114 may enable a user to specify a criterion under which a state of a coordinated device 112 should be changed, and then automatically operate to change the state of the coordinated device 112 when the criterion is satisfied. As will be discussed below, many functions of the coordinator 114 may be established via tasks, enabling rapid alteration of these functions as desired by a user.

Client devices 102 may include a variety of computing devices enabling a user to communicate with the coordinated environments 110, the service provider environment 120, or both. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The service provider environment 120 may provide the client devices 102 with one or more user interfaces, command-line interfaces (CLI), application programing interfaces (API), and/or other programmatic interfaces for interacting with the service provider environment 120, such as to submit a configuration for a coordinator 114, and control deployment of that configuration, to submit code corresponding to a task to be executed on the coordinator 114 or an on-demand code execution environment 150 of the service provider environment 120, to view logging or monitoring information related to coordinators 114, etc. Similarly, the coordinator 114 may provide the client devices 102 with one or more user interfaces, command-line interfaces (CLI), application programing interfaces (API), and/or other programmatic interfaces for interacting with the coordinator 114, such as to read a state of a coordinated device 112, request a change in state of a coordinated device 112, request that the coordinator 114 cause execution of a task, etc. Although one or more embodiments may be described herein as using a user interface, it should be appreciated that such embodiments may, additionally or alternatively, use any CLIs, APIs, or other programmatic interfaces.

The service provider environment 120 can include a number of elements to enable configuration of, management of, and communications with coordinators 114. Specifically, the service provider environment 120 includes a management and deployment service 130 to enable registration of coordinators 114 with the service provider environment 120 and configuration of such coordinators 114, a device shadow service 140 to enable robust changes to state of coordinators 114 and coordinated devices 112, and an on-demand code execution environment 150 providing on-demand, dynamic execution of tasks, as well as deployment and provisioning of tasks on coordinators 114.

As shown in FIG. 1, the management and deployment service 130 includes a client and data interface 132 and a configuration data store 134 that may operate collectively to enable registration of a coordinator 114 with the management and deployment service 130, generation of configurations for the coordinator 114, and transmission of configuration data to the coordinator 114. Illustratively, the client and data interface 132 may provide one or more user interfaces (e.g., APIs, CLIs, GUIs, etc.) through which a user, via a client device 102, may generate or submit a configuration of a coordinator 114 for storage in the configuration data store 134. The client and data interface 132 may further provide one or more interfaces through which a coordinator 114 may obtain the configuration, such that the coordinator 114 is reconfigured according to the obtained configuration. The configuration data store 134 can correspond to any persistent or substantially persistent data store, such as a hard drive (HDD), a solid state drive (SDD), network attached storage (NAS), a tape drive, or any combination thereof.

In some embodiments, the on-demand code execution environment 150 may include multiple edge locations from which a user device can retrieve content. Individual edge location 140 may be referred to herein as a point of presence ("POP"), where a POP is intended to refer to any collection of related computing devices utilized to implement functionality on behalf of the on-demand code execution environment 150. POPs are generally associated with a specific geographic location in which the computing devices implementing the POP are located, or with a region serviced by the POP. As illustrated in FIG. 1, the POP 140 can include one or more information processing components 142 for providing on-demand execution of tasks (e.g., portable code segments). In some instances, the POPs may implement one or more services, such as CDN services, data storage services, data processing services, etc. The CDN service provider 140 may include multiple POPs located in different geographic locations so that coordinated devices 114 can communicate with a logically proximate POP to transmit requests for authentication and authorization and receive processing results.

The on-demand code execution environment 150 can include a number of devices providing on-demand execution of tasks (e.g., portable code segments). Specifically, the on-demand code execution environment 150 can include a frontend 152, through which users, via client device 102, may submit tasks to the on-demand code execution environment 150 and call for execution of tasks on the on-demand code execution environment 150. Such tasks may be stored, for example, in a task data store 154, which can correspond to any persistent or substantially persistent data store, such as a hard drive (HDD), a solid state drive (SDD), network attached storage (NAS), a tape drive, or any combination thereof. While not shown in FIG. 1, the on-demand code execution system 150 can include a variety of additional components to enable execution of tasks, such as a number of execution environments (e.g., containers or virtual machines executing on physical host devices of the on-demand code execution environment 150), a worker manager to manage such execution environments, and a warming pool manager to assist in making execution environments available to the worker manager on a rapid basis (e.g., under 10 ms). Further details regarding the on-demand code execution environment can be found within the '556 Patent, incorporated by reference above.

As noted above, tasks may be utilized both at the on-demand code execution environment 150, POPs 140 and at coordinators 114. As noted above, tasks correspond to individual collections of user code (e.g., to achieve a specific function). References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. Specific executions of that code are referred to herein as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 150 or a coordinator 114 in a variety of manners. In one embodiment, a client device 102 or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of a coordinator 114, a network-accessible storage service, or the task data store 154) prior to the request being received by the coordinator 114 or the on-demand code execution system 150. A request interface of the coordinator 114 or the on-demand code execution system 150 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to a coordinator 114 or the on-demand code execution system 150 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the coordinator 114 or the on-demand code execution system 150 (e.g., standard routines), and/or provided by third parties. In some embodiments, such resource-level constraints (e.g., how much memory is to be allocated for executing a particular user code) are specified for the particular task, and may not vary over each execution of the task. In such cases, the coordinator 140 or the on-demand code execution system 150 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the coordinator 114 or the on-demand code execution system 150 may inspect the call and look for the flag or the header, and if it is present, the coordinator 114 or the on-demand code execution system 150 may modify the behavior (e.g., logging facilities) of the execution environment in which the task is executed, and cause the output data to be provided back to the user. In some embodiments, the behavior/mode indicators are added to the call by the user interface provided to the user by the coordinator 114 or the on-demand code execution system 150. Other features such as source code profiling, remote debugging, etc., may also be enabled or disabled based on the indication provided in a call.

The service provider environment 120 is depicted in FIG. 1 as operating in a distributed computing environment including several computer systems that are interconnected using one or more computer networks (not shown in FIG. 1). The service provider environment 120 could also operate within a computing environment having a fewer or greater number of devices than are illustrated in FIG. 1. Thus, the depiction of the service provider environment 120 in FIG. 1 should be taken as illustrative and not limiting to the present disclosure. For example, the service provider environment 120 or various constituents thereof could implement various Web services components, hosted, or "cloud" computing environments, and/or peer to peer network configurations to implement at least a portion of the processes described herein. In another example, individual POPs 140 may be implemented in one or more physical data centers geographically distinct from other POPs and the remaining components of the service provider environment 120. Accordingly, the POPs 140 may utilize either a private communication network or public communication networks, such as the Internet, to implement the communications discussed in the present application.

Further, the service provider environment 120 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

Figure 2:
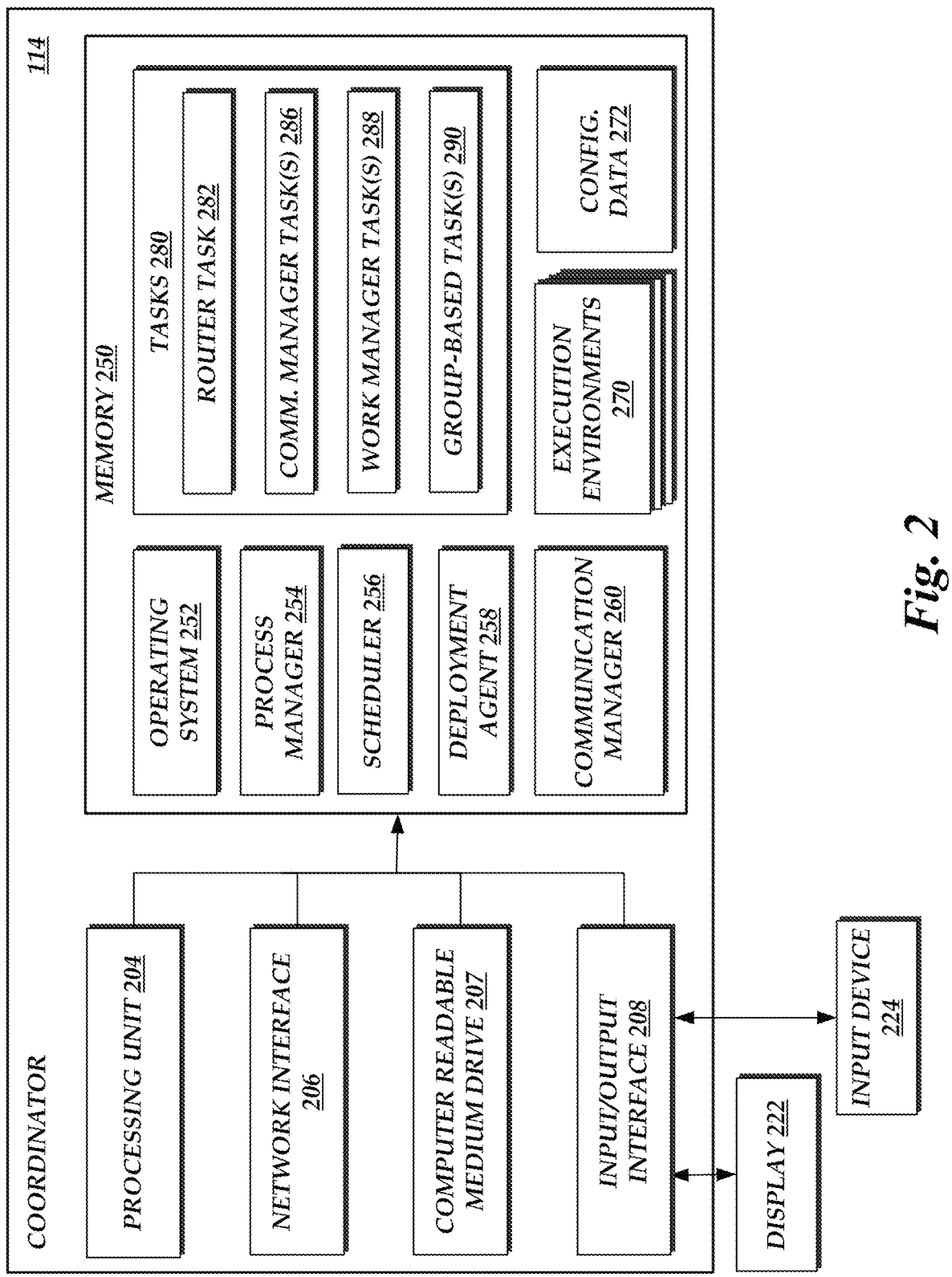
FIG. 2 depicts a general architecture of a computing device providing a coordinator of FIG. 1.

FIG. 2 depicts a general architecture of a computing system (referenced as coordinator 114) that manages coordinated devices 112 within a given coordinated environment 110. The general architecture of the worker manager 140 depicted in FIG. 2 includes an arrangement of computer hardware and software modules that may be used to implement aspects of the present disclosure. The hardware modules may be implemented with physical electronic devices, as discussed in greater detail below. The coordinator 114 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the coordinator 114 includes a processing unit 204, a network interface 206, a computer readable medium drive 207, and an input/output device interface 208, all of which may communicate with one another by way of a communication bus. The network interface 206 may provide connectivity to one or more networks or computing systems. The processing unit 204 may thus receive information and instructions from other computing systems or services via the network 104. The processing unit 204 may also communicate to and from memory 250 and further provide output information for an optional display (not shown) via the input/output device interface 208. The input/output device interface 208 may also accept input from an optional input device (not shown).

The memory 250 may contain computer program instructions (grouped as modules in some embodiments) that the processing unit 204 executes in order to implement one or more aspects of the present disclosure. The memory 250 generally includes random access memory (RAM), read only memory (ROM) and/or other persistent, auxiliary, or non-transitory computer readable media. The memory 250 may store an operating system 252 that provides computer program instructions for use by the processing unit 204 in the general administration and operation of the coordinator 114. The memory 250 may further include computer program instructions and other information for implementing aspects of the present disclosure. For example, in one embodiment, the memory 250 includes a process manager 254, a scheduler 256, a deployment agent 258, and a communication manager 260.

The scheduler 256 and deployment agent 258 may be executed by the processing unit 204 to select tasks for execution by the processing unit 204, and to manage such task executions. Specifically, the scheduler 256 may include instructions to select tasks for execution at given points in time and to suspend execution of tasks (e.g., under instances of constrained resources at the coordinator 114). The deployment agent 258 may include instructions to select an appropriate execution environment 270 in which to execute a task, to provision that execution environment 270 with appropriate access to resources needed during the task execution, and to cause execution of the task within the execution environment 270. An execution environment 270, as used herein, refers to a logical portion of memory 250 in which to execute a task. In one embodiment, execution environments 270 are programmatically separated, such that execution of code in a first execution environment 270 is prohibited from modifying memory associated with another execution environment 270. Illustratively, an execution environment 270 may correspond to a "container," operating-system-level virtualization environment, or "sand box" environment, such as a "chroot jail," or a Python virtual environment "virtualenv." In other instances, an execution environment 270 may correspond to a virtual machine environment (e.g., a JAVA virtual machine, a virtualized hardware device with distinct operating system, etc.). In still other instances, an execution environment 270 may be a memory space allocated to an execution of a task, without necessarily utilizing virtualization.

Communications between tasks executing on the coordinator, as well as between the coordinator 114 and other devices (e.g., client devices 102 and coordinated devices 112) may be facilitated by the communication manager 260. Specifically, the communication manager 260 may be configured to obtain messages directed to the coordinator 114 and forward the message to the appropriate destination. For example, the communication manager 260 may route messages between any combination of tasks, coordinated devices 112, client devices 102, and devices of the service provider execution environment 120.

Tasks executed by the coordinator 114 are shown as logically grouped within the tasks memory space 280, which may correspond to a logical unit of memory 250 configured to store the code corresponding to each task. As shown in FIG. 2, the tasks memory space 280 can include a number of tasks executable by the processing unit 204 to implement functionalities of the coordinator 114, including a router task 282, one or more communication manager tasks 286, a shadow service task 288, and one or more client-provided tasks 290.

The router task 282 may correspond to a portion of code executable to assist in the routing of messages within, to, and from the coordinator. In one embodiment, the router task 282 implements a "routing table" to determine appropriate destinations for a message. For example, the communication manager 260 may forward messages obtained at the coordinator 114 (e.g., due to generation by a task execution or reception at the input/output interface 208) to the router task 282, which may utilize the routing table to determine that messages addressed to a certain identifier should be routed to a given task, a given client device 102, or a given coordinated device 102. The routing table may further indicate that a message addressed to an identifier should be transmitted to the service provider environment 120 (e.g., to the device shadow service 140 or the on-demand code execution system 150). In one embodiment, the routing table may utilize "topics" as identifiers, such that messages associated with a particular topic are routed according to a routing specified for that topic. The routing table may further include information for how to route messages based on a source of those messages. For example, a message addressed to a given topic may be routed differently, based on whether the message is received from a first task, a second task, a first coordinated device 112, etc. By utilization of a routing table, router task 282 can enable messages to be redirected, without a change in the operation of a sender of such a message (e.g., without rewriting code for a task that generated the message, without modifying the software of a coordinated device 112 that generated the message, etc.).

The communication manager tasks 286 may enable communications between the coordinator 114 and a number of different external devices (e.g., coordinated devices 102) according to a protocol of such communications. For example, a first communication manager task 286 may be configured to manage communications using a BLUETOOTH™ protocol, a second communication manager may be configured to manage communications using an HTTP protocol, etc. In some instances, multiple communication manager tasks 286 may work collectively to implement communications. For example, a first communication manager task 286 may enable communications via the TCP protocol, while a second communication manager task 286 may enable communications via the MQTT protocol (which utilizes the TCP protocol and thus may utilize a first communication manager task 286). Because different communication manager tasks 286 can vary the ability of the coordinator 114 to communicate via different protocols, and because the tasks of the coordinator 114 may be altered via reconfiguration of the coordinator 114, the coordinator 114 can be rapidly reconfigured to utilize a variety of different communication protocols.

The shadow service task 288 can facilitate management and interaction with device shadows maintained at the coordinator 114. Illustratively, the shadow service task 288 can implement functionality similar to that provided by the device shadow service 140 locally to the coordinator 114. Accordingly, the shadow service task 288 can maintain a shadow state (data representing a desired state) of a coordinated device 112, and allow for reading to or writing to such data. The shadow service task 288 can further enable synchronization of a coordinated device 112 with the device shadow for that device. Accordingly, by modifying a device shadow for a coordinated device 112, the state of the coordinated device 112 can be altered. By reading the device shadow for the coordinated device 112, the state of the coordinated device 112 can be determined. In some instances, the shadow service task 288 may further coordinate with another device shadow for a given device, such as a device shadow maintained by the device shadow service 140. For example, the shadow service task 288 may synchronize a local device shadow with a device shadow stored at the device shadow service 140, resolve conflicts between the local device shadow and the device shadow stored at the device shadow service 140, etc.

In addition to the tasks described above (each of which may illustratively be provided by an entity associated with the service provider environment 120), the tasks memory space 280 may include any number of client-provided tasks 290, which may correspond to executable code generated by a client device 102 and submitted to the service provider environment 120 for deployment to a coordinator 114. As such, functionalities provided by the client-provided tasks 290 may vary according to the desires of a submitting user. In some instances, the client-provided tasks 290 may be written in a coding language for which the memory 250 includes a language runtime. For example, where the coordinator 114 supports language such as node.js, Go, JAVA, and Python, the client-provided tasks 290 may include executable code written in any of those languages.

In addition, the memory 250 includes a configuration data portion 272, representing a logical portion of the memory 250 in which configuration data of the coordinator 114 is stored. The configuration data may include, for example, a current deployment version of the coordinator 114, data stored by the tasks of the task memory space 280, or other data used in the operation of the coordinator 114.

To enable configuration (and reconfiguration) of the coordinator 114, the memory 250 further includes a deployment agent 258. The deployment agent 258 can correspond to code executable to register a coordinator with the service provider environment 120, to determine a desired configuration of the coordinator 114, and in instances where a current configuration of the coordinator 114 does not match a desired configuration, to obtain configuration data for the coordinator 114 and modify the memory 250 to implement the desired configuration.

Figure 3A:
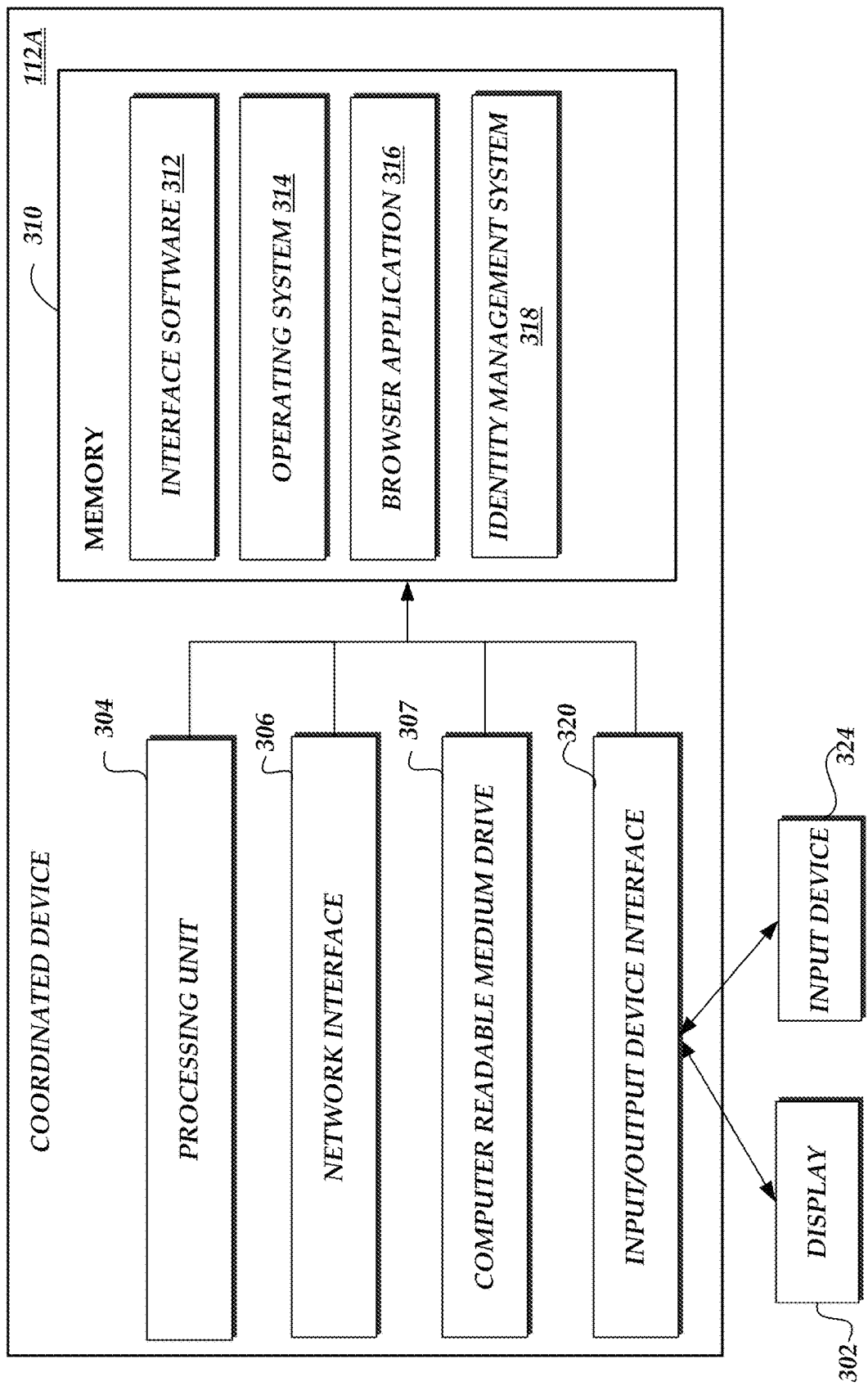
FIGS. 3A and 3B depict general architectures of coordinated devices managed by the coordinator of FIG. 1.

FIG. 3A depicts one embodiment of an architecture of an illustrative coordinated device 112A in accordance with the present application. The general architecture of the coordinated device 112A depicted in FIG. 3A includes an arrangement of computer hardware and software components that may be used to implement aspects of the present disclosure. As illustrated, the coordinated device 112A includes a processing unit 304, a network interface 306, a computer readable medium drive 307, an input/output device interface 320, an optional display 302, and an input device 324, all of which may communicate with one another by way of a communication bus. Illustratively, the coordinated device 112A may have more limited functionality and components, such as inputs or outputs, as embedded devices.

The network interface 306 may provide connectivity to one or more networks or computing systems, such as the network 104 of FIG. 1. The processing unit 304 may thus receive information and instructions from other computing systems or services via a network. The processing unit 304 may also communicate to and from memory 310 and further provide output information for an optional display 302 via the input/output device interface 320. The input/output device interface 320 may also accept input from the optional input device 324, such as a keyboard, mouse, digital pen, etc. In some embodiments, the coordinated device 112A may include more (or fewer) components than those shown in FIG. 3A. For example, some embodiments of the coordinated device 112 may omit the display 302 and input device 324, while providing input/output capabilities through one or more alternative communication channel (e.g., via the network interface 306). Additionally, the coordinated device 112A may omit the input and output interface 320 altogether as well.

The memory 310 may include computer program instructions that the processing unit 204 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the coordinated device 112A. The memory 310 may further include computer program instructions and other information for implementing aspects of the present disclosure. For example, in one embodiment, the memory 310 includes a browser application 316 for accessing content. Illustratively, the browser application 316 may encompass a full software browser application, portions of a browser application or simply be a software application (or executable instructions) that provide for data connectivity. As also illustrated in FIG. 3A, the coordinated device 112A may further interact with an identity management application 318 for facilitating authorization and authentication of the coordinated devices as described herein. The identity management application 318 may be incorporated as part of the coordinated devices 112A or, as illustrated in FIG. 3A, be a stand-alone application.

Figure 3B:
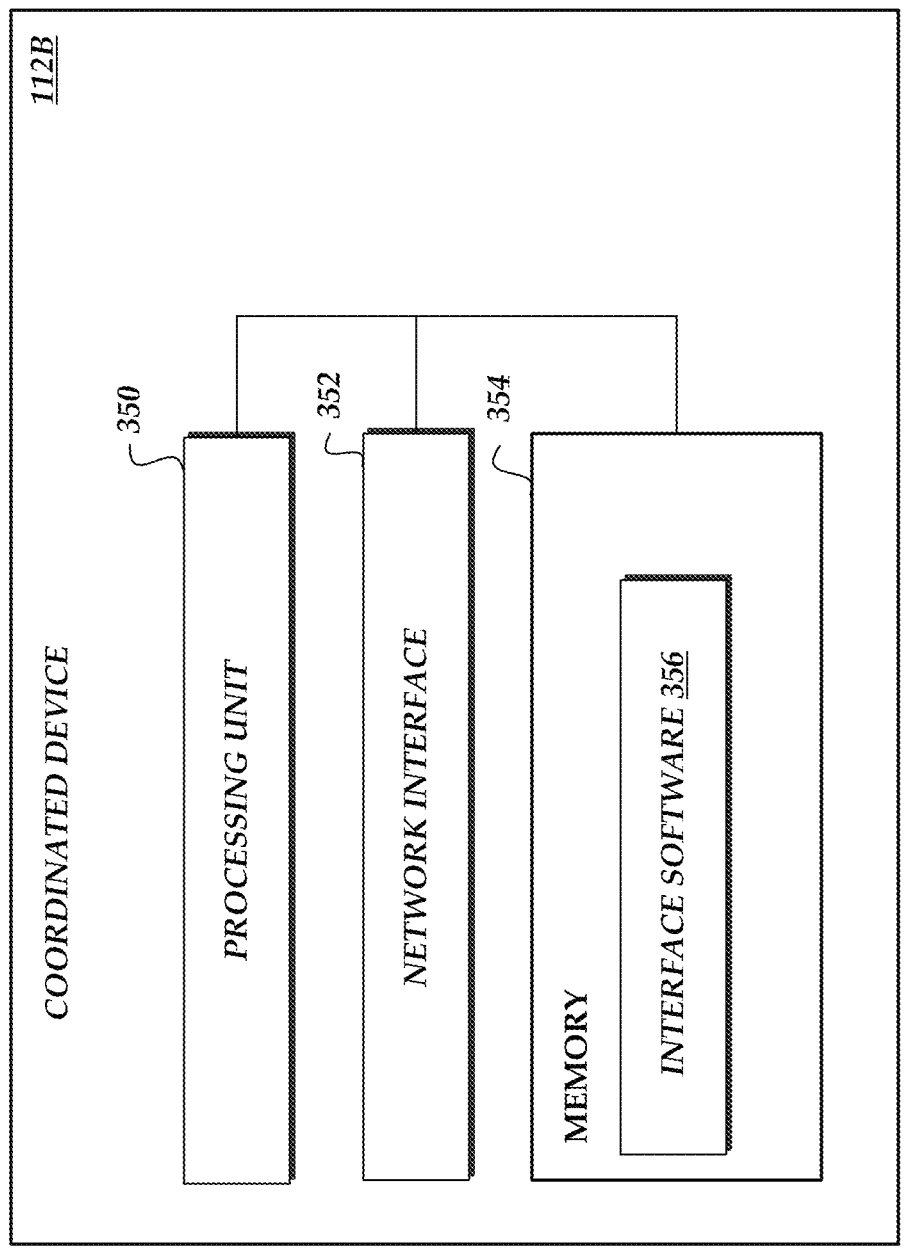

FIG. 3B depicts one embodiment of an alternative architecture of an illustrative coordinated device 112B in accordance with the present application. The general architecture of the coordinated device 112B depicted in FIG. 3B includes an arrangement of computer hardware and software components that may be used to implement aspects of the present disclosure. However, coordinated device 112B may be associated with a reduced of components that may limit the computing functionality and operation of the coordinated device 112B. As illustrated, the coordinated device 112B includes a processing unit 350 and a network interface 352 that communicate with a communication bus. Unlike coordinated device 112BA of FIG. 3A, the coordinated device 112B may not have a computer readable medium drive, an input/output device interface, an optional display, or an input device.

The network interface 352 may provide connectivity to one or more networks or computing systems, such as the network 104 of FIG. 1. The processing unit 350 may thus receive information and instructions from other computing systems or services via a network. The memory 354 may include computer program instructions that the processing unit 350 executes in order to implement one or more embodiments. The memory 354 generally includes RAM, ROM, or other persistent or non-transitory memory. In this embodiment, the memory 354 may store necessarily store a full operating system that provides computer program instructions for use by the processing unit 350 in the general administration and operation of the coordinated device 112B. Rather, in one embodiment, the memory 354 includes an interface software component 356 for accessing receiving and processing instructions.

Figure 4:
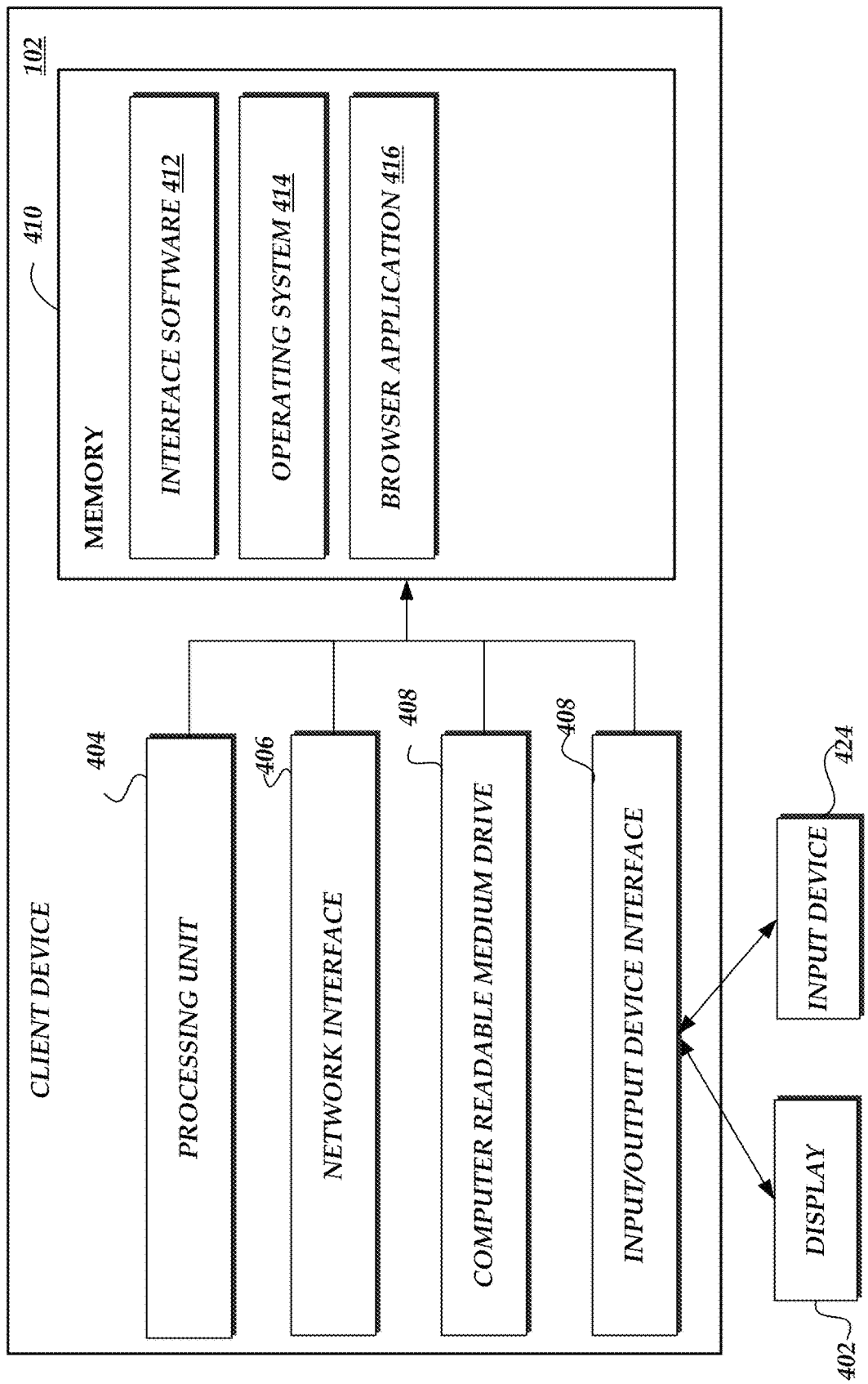
FIG. 4 depicts a general architecture of client device that may be utilized to generate and submit configuration information related to managing configuration of authentication and authorization services in edge devices.

FIG. 4 depicts one embodiment of an architecture of an illustrative client device 102 in accordance with the present application. The general architecture of the client device 102 depicted in FIG. 4 includes an arrangement of computer hardware and software components that may be used to implement aspects of the present disclosure. As illustrated, the client device 102 includes a processing unit 404, a network interface 406, a computer readable medium drive 407, an input/output device interface 420, an optional display 402, and an input device 424, all of which may communicate with one another by way of a communication bus.

The network interface 406 may provide connectivity to one or more networks or computing systems, such as the network 104 of FIG. 1. The processing unit 404 may thus receive information and instructions from other computing systems or services via a network. The processing unit 404 may also communicate to and from memory 410 and further provide output information for an optional display 402 via the input/output device interface 420. The input/output device interface 420 may also accept input from the optional input device 424, such as a keyboard, mouse, digital pen, etc. In some embodiments, the client device 102 may include more (or fewer) components than those shown in FIG. 4. For example, some embodiments of the coordinated device 112 may omit the display 402 and input device 424, while providing input/output capabilities through one or more alternative communication channel (e.g., via the network interface 406). Additionally, the client device 102 may omit the input and output interface 420 altogether as well.

The memory 410 may include computer program instructions that the processing unit 204 executes in order to implement one or more embodiments. The memory 410 generally includes RAM, ROM, or other persistent or non-transitory memory. The memory 410 may store an operating system 414 that provides computer program instructions for use by the processing unit 404 in the general administration and operation of the client device 102. The memory 410 may further include computer program instructions and other information for implementing aspects of the present disclosure. For example, in one embodiment, the memory 410 includes a browser application 416 for accessing content. Illustratively, the browser application 416 may encompass a full software browser application, portions of a browser application or simply be a software application (or executable instructions) that provide for data connectivity. For purposes of the present application, client 102 can facilitate the configuration of edge locations 140 or other configurations.

Figure 5A:
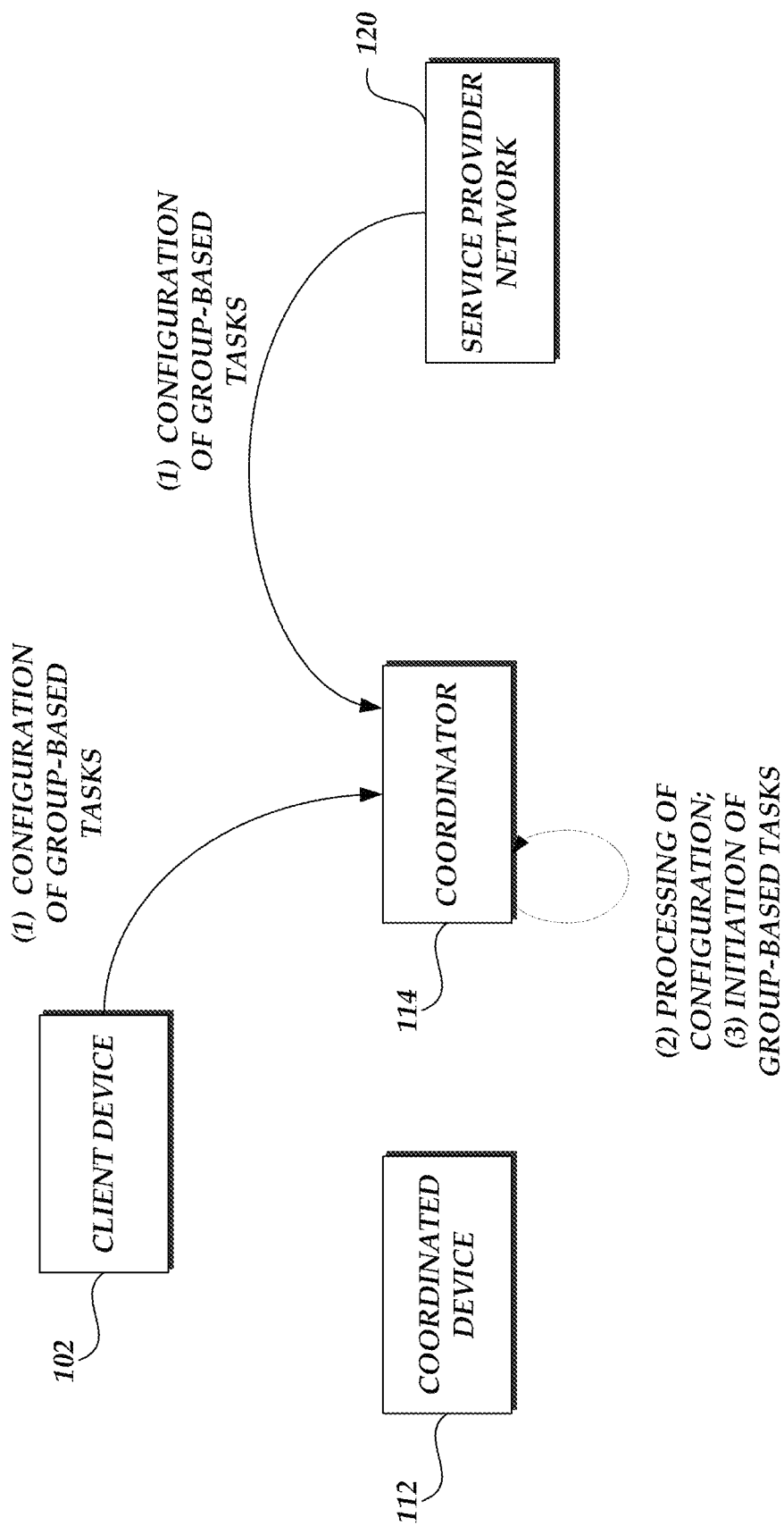
FIGS. 5A-5C are block diagrams of the illustrative environment of FIG. 1 depicting illustrative interaction processing content messages will be described.
Figure 5B:
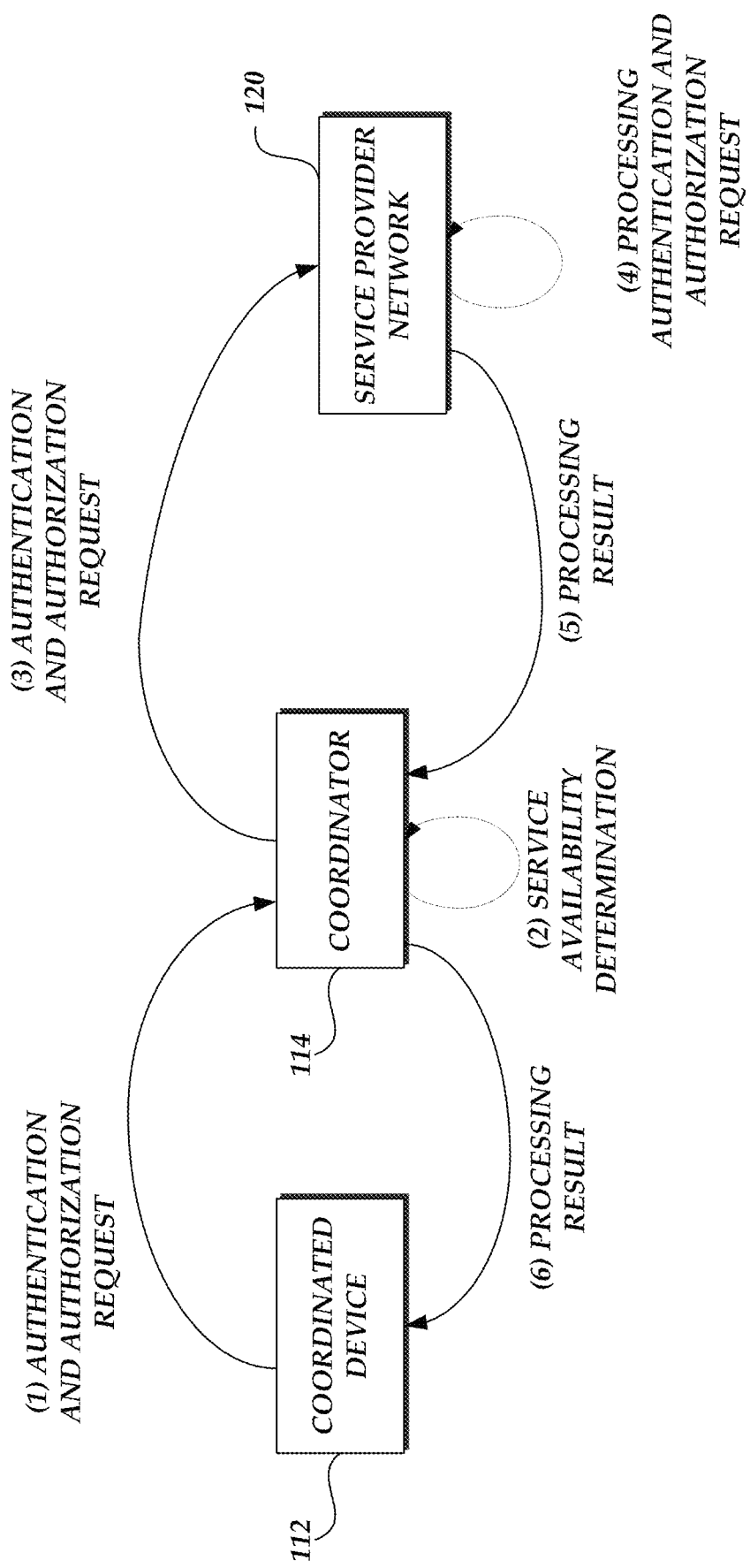
Figure 5C:
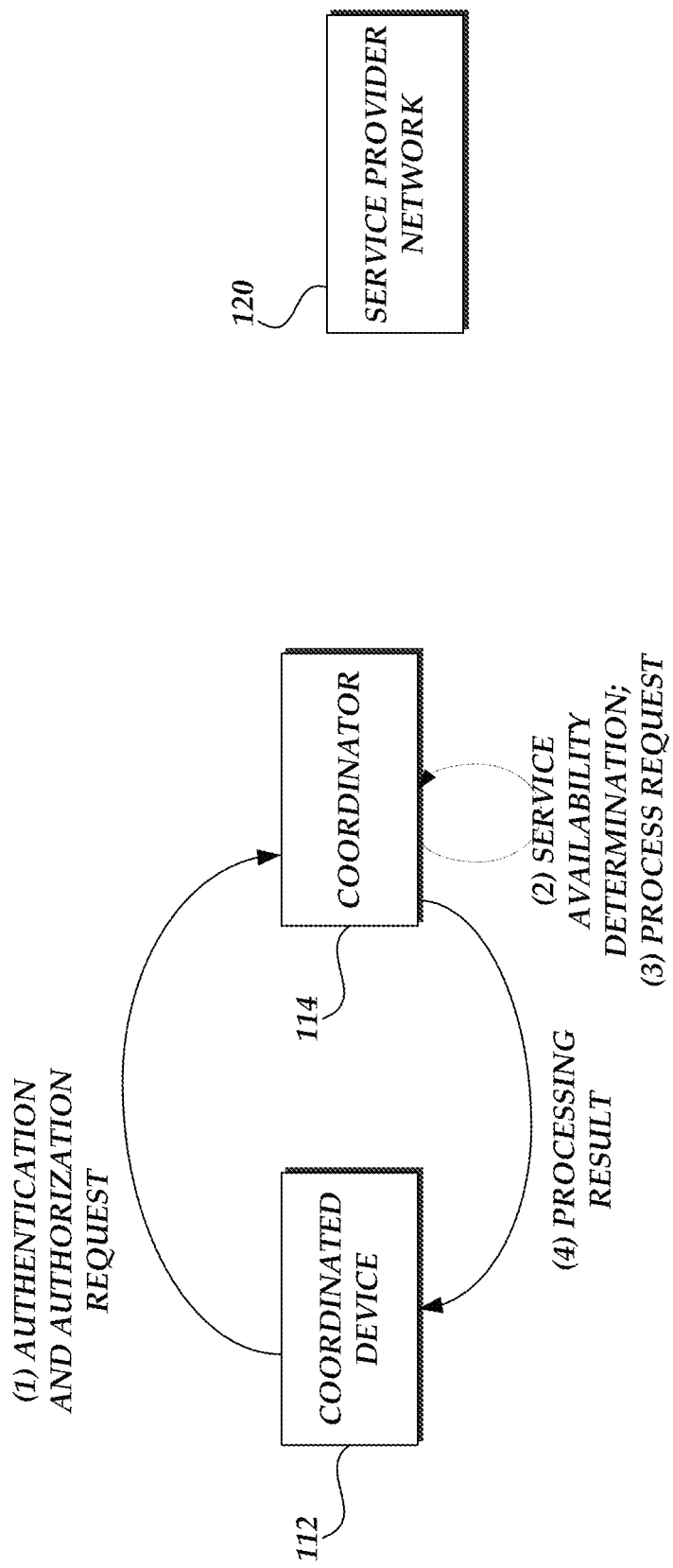

Turning now to FIGS. 5A-5C, illustrative interactions between the components of the content management system 110 to process content messages will be described. More specifically, FIGS. 5A-5C will be described with regard to interactions between coordinated devices 112, coordinator 114, and the service provider environment 120. As previously indicated, the coordinator 114 may be configured in one embodiment to execute tasks related to receiving and maintaining authorization and authentication information and processing authentication and authorization requests from coordinated devices 112 to generate processing results. However, reference to interactions should not be limited to any particular device or combination of devices, even if used for illustrative purposes.

With reference to FIG. 5A, the initial configuration of a coordinated device 114 will be described. Illustratively, the service provider environment 120 coordinates individual coordinated devices 114 with information that facilitates the receipt of authorization and authentication information. Illustratively, the authorization and authentication information can correspond executable code that incorporates one or more rules, policies or logical steps to be able to receive requests for authorization or authentication of individual users attempting to access specific coordinate devices 112, resources associated or accessed by coordinated devices 112 or otherwise interact with coordinated devices 112. At (1), the coordinator 114 transmits requests for local versions of authentication and authorization information maintained by the service provider environment 120. The request may be based on evaluating specific criteria, such as time criteria, receipt of a request, initiation by a system administrator, and the like. In other embodiments, it may be possible that the service provider environment 120 can initiate the request or delivery of local versions of authorization and authentication information.

At (2), the service provider environment 120 processes the request and identifies relevant authentication and authorization information. Illustratively, the service provider environment 120 can execute tasks or other executable code that can associate the coordinator 114 with one or more coordinated devices 112. For example, the service provider environment 120 can determine the set of users that are associated with coordinated devices 112 that are identified in the coordinator 114 request or otherwise known to be associated with the coordinator 114 (e.g., via configuration information). Illustratively, the authentication and authorization information can include secured information, such as electronic tokens or other data, that will be utilized to generate the processing results based on evaluation of requests. In some embodiments, the message service provider environment 120 requests code utilizing an interface. The service provider environment 120 can validate that the set of users for the one or more coordinated devices 112 should be included in the local authorization and authentication information, such as by evaluating rules, logic, or established policies.

At (3), the service provider environment 120 determines authentication and authorization parameters for the authentication and authorization information. Illustratively, the service provider environment 120 can associated various properties to the authentication and authorization information, such as time expirations, network limitation (e.g., the IP address from which requests will be processed), communication protocol limitations, additional security information, and the like. As will be described below, in some embodiments, the coordinators 114 can evaluate the processing information, such as authentication and authorization parameters, in determining whether the coordinator can utilize locally stored authentication and authorization information to evaluate coordinated device requests or otherwise control how such requests are processed.

At (4), the service provider environment 120 transmits the authentication and authorization information to the coordinator 114. The coordinator 114 stores the authentication and authorization information or otherwise updates previously provided authentication and authorization information at (5). In illustrative embodiments, the authentication and authorization information can be encrypted in manner that can only be accessed by the coordinated device/user. Additionally, the service provider environment 120 can transmit updates with or without request, such as based on time criteria, responsive to a determined update at the version of the authorization and authentication information maintained at the service provider environment, expiration of the previously provided authentication and authorization information, and the like. Accordingly, at (6), the service provider environment 120 is illustrated as providing one or more updates to the coordinator 114.

With reference to FIG. 5B, a first processing of requests will be described. Illustratively, a coordinated device 112 has received a request from one or more users to access the coordinated device 112 or coordinated device resources, such as via another computing device. At (1), the coordinate device 112 transmits the request to the coordinator 114. For example, the coordinate device may utilize the MQTT protocol to identify the request and provide information that can be utilized to evaluate the request, such as provided login, password, biometric information, etc. The interaction between the coordinated devices 112 and coordinator 114 may entail a number of communications. Depending on the type of request, the information included in the request can include identifiers, previously issued tokens, security information, and the like.

At (2), the coordinator 114 determines whether the service provider environment 120 is available to receive and process requests. In one embodiment, the coordinator may look for network connectivity and the availability to securely transmit requests to the service provider environment 120. In other embodiments, the coordinator 114 may evaluate specific criteria, such as time of day, a number or state of computing devices (including the coordinator 114), information associated with the specific request (e.g., IP address, type of request, type of coordinated device 112, specific coordinated devices, etc.) that may define conditions for the coordinator 114 to be able to transmit request. Accordingly, the determination of availability of the service provider environment 120 can include a determination of the ability for communications to be exchanged, an evaluation of criteria defining whether the service provider environment 120 will evaluate authentication and authorization requests, an evaluation of criteria defining whether the coordinator 114 should transmit requests (independent of whether the service provider environment 120 is capable of processing, or a combination thereof.

In the illustration of FIG. 5B, at (3), the coordinator 114 determines that the request can be processed by the service provider environment 120 based on the availability of network or evaluation of the rules provided by the service provider environment 120 and transmits the authentication and authorization request to the service provider environment 120. At (4), the on-demand code execution environment 150 of the service provider environment 120 can execute tasks related to evaluation of the received request and stored authentication and authorization information and generate a processing result. The processing result can illustratively include a denial of the request, an acceptance of the request, a generation of authorization tokens, a validation of offered tokens, a renewal of tokens, and the like. At (5), the service provider environment 120 transmits the processing result to the coordinator 114, which in turns returns the processing result to the coordinated device 112 at (6). Although illustrated as single interactions, the return of the processing results may encompass a number of interactions between the various components of the service provider environment 120 and the coordinator 114 and coordinated devices 112.

With reference to FIG. 5C, a second processing of authentication and authorization requests will be described with regard to requests that are processed by the coordinator 114. Illustratively, a coordinated device 112 has received a request from one or more users to access the coordinated device 112 or coordinated device resources, such as via another computing device. At (1), the coordinate device 112 transmits the request to the coordinator 114. For example, the coordinate device may utilize the MQTT protocol to identify the request and provide information that can be utilized to evaluate the request, such as provided login, password, biometric information, etc. The interaction between the coordinated devices 112 and coordinator 114 may entail a number of communications.

At (2), the coordinator 114 determines whether the service provider environment 120 is available to receive and process requests. As described above, in one embodiment, the coordinator may look for network connectivity and the availability to securely transmit requests to the service provider environment 120. In other embodiments, the coordinator 114 may evaluate specific criteria, such as time of day, a number or state of computing devices (including the coordinator 114), information associated with the specific request (e.g., IP address, type of request, type of coordinated device 112, specific coordinated devices, etc.) that may define conditions for the coordinator 114 to be able to transmit request. Accordingly, the determination of availability of the service provider environment 120 can include a determination of the ability for communications to be exchanged, an evaluation of criteria defining whether the service provider environment 120 will evaluate authentication and authorization requests, an evaluation of criteria defining whether the coordinator 114 should transmit requests (independent of whether the service provider environment 120 is capable of processing, or a combination thereof.

In the illustration of FIG. 5C, at (3), the coordinator 114 determines that the request cannot be processed by the service provider environment 120 based on the availability of network or evaluation of the rules provided by the service provider environment 120 and the coordinator 114 can execute tasks related to evaluation of the received request and received authentication and authorization information and generate a processing result. The processing result can illustratively include a denial of the request, an acceptance of the request, a generation of authorization tokens, a validation of offered tokens, a renewal of tokens, and the like. In some embodiments, the coordinators 114 may be able to process the same type of requests that could be processed by the service provider environment 120 and may be able to generate the same type of processing results. In other embodiments, the types of requests or types of resulting processing results associated with a coordinator 114 processing may be different. For example, the coordinator 114 may be configured so that it can only validate or renew tokens but cannot issue new tokens. At (5), the coordinator 114 returns the processing result to the coordinated device 112 at (6).

Figure 6A:
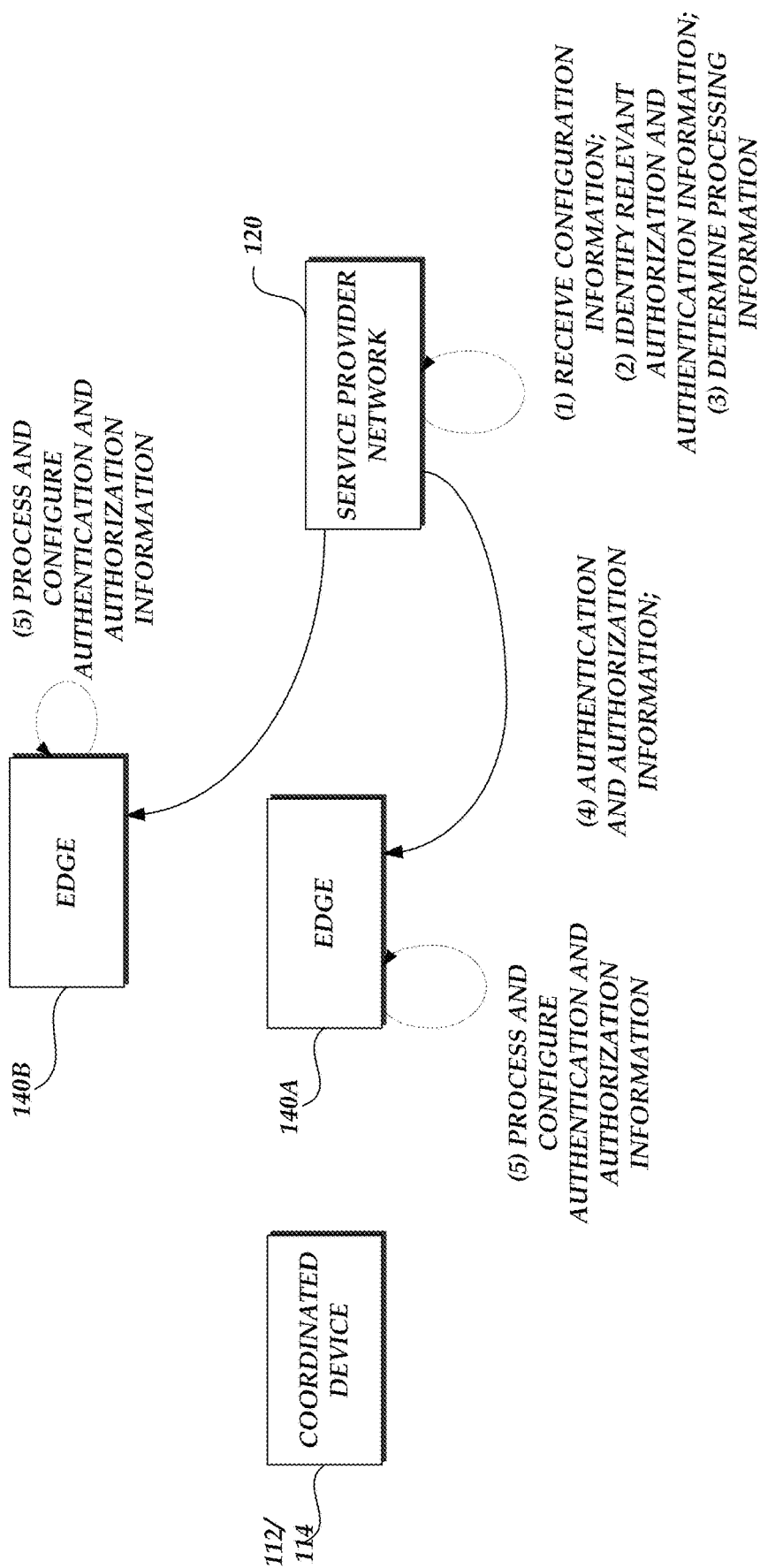
FIGS. 6A-6B are block diagrams of the illustrative environment of FIG. 1 depicting illustrative interactions for processing content messages will be described.
Figure 6B:
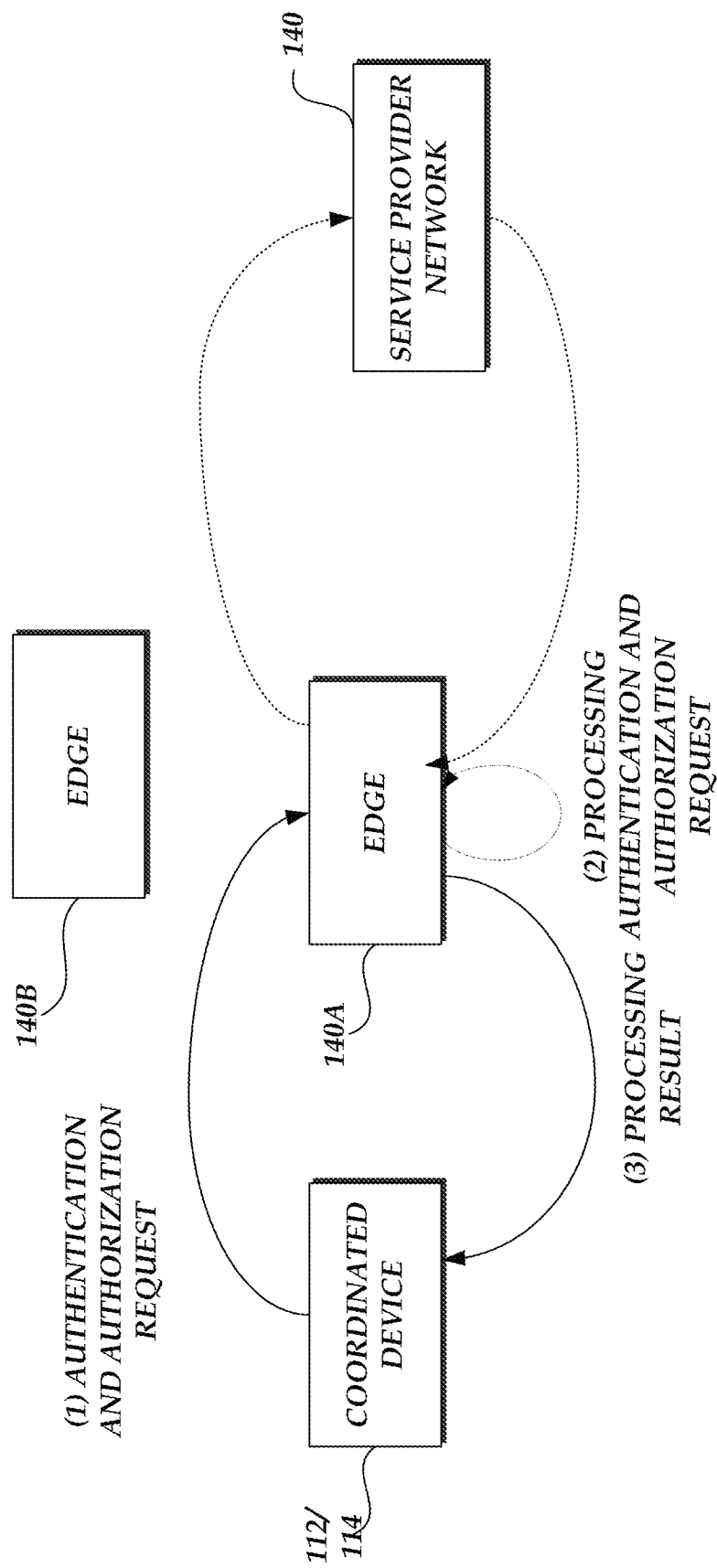

Turning now to FIGS. 6A-6B, illustrative interactions between the components of the content management system 110 to process content messages will be described. More specifically, FIGS. 6A-6B will be described with regard to interactions between coordinated devices 112, coordinator 114, and the service provider environment 120 utilizing edge components 140. As previously indicated, the edge components 140 may be configured in one embodiment to execute tasks related to receiving and maintaining authorization and authentication information and processing authentication and authorization requests from coordinated devices 112 to generate processing results. However, reference to interactions should not be limited to any particular device or combination of devices, even if used for illustrative purposes.

With reference to FIG. 6A, the initial configuration of edge components 140 will be described. Illustratively, the service provider environment 120 coordinates individual edge component 140 with information that facilitates the receipt of authorization and authentication information. Illustratively, the authorization and authentication information can correspond executable code that incorporates one or more rules, policies or logical steps to be able to receive requests for authorization or authentication of individual users attempting to access specific coordinate devices 112, resources associated or accessed by coordinated devices 112 or otherwise interact with coordinated devices 112. In the embodiment illustrated in FIG. 6A, the service provider environment 120 may transmit authorization and authentication information to various POPs 140, such as in response to receipt of configuration information. In other embodiments, the service provider environment 120 may not push authorization and authentication information to the POPs 140, but will respond to requests for additional information (as discussed with regard to FIG. 8) to populate authorization and authentication information to the POPs.

At (1), the service provider environment 120 receives system administrator information to configure the edge components in POPs 140. Illustratively, the service provider environment 120 can execute tasks or other executable code that can associate the edge components 140 with one or more coordinated devices 112 or coordinators 114. For example, the service provider environment 120 can determine the set of users that are associated with coordinated devices 112 that are identified in the coordinator 114 request or otherwise known to be associated with the coordinator 114 (e.g., via configuration information).

Illustratively, the authentication and authorization information can include secured information, such as electronic tokens or other data, that will be utilized to generate the processing results based on evaluation of requests. In some embodiments, the service provider environment 120 can obtain the requests code utilizing an interface. Additionally, the service provider environment 120 can receive information that associates pools of users to edge locations 140. For example, the edge locations can be associated with physical proximity to coordinators 114 or coordinated devices 112. The association may be individual edge location to a set of coordinated devices 112 or multiple edge location to the same set of coordinated devices.

At (2), the service provider environment 120 can identify the relevant authentication and authorization information for each of the identified set of coordinated devices 112. Illustratively, the relevant authentication and authorization information for the set of coordinated devices 112 may be organized in a hierarchical distribution. In this embodiment, the authentication and authorization information can have a highest level corresponding to a user pool of coordinated devices/users. The user pool can be subdivided into one or more intermediary nodes forming one or more levels of grouping of coordinated devices/users, generally referred to as groups or group nodes. Each group node can specify various policies and rules that are associated with all coordinated devices/users. At the lowest level of the hierarchy are end nodes that correspond to individual coordinated devices/users. Each end node corresponds to individual coordinated devices/users and specifies individual attributes of the coordinated device/user.

At (3), the service provider environment 120 determines authentication and authorization parameters for the authentication and authorization information. Illustratively, the service provider environment 120 can associated various properties to the authentication and authorization information, such as time expirations, network limitation (e.g., the IP address from which requests will be processed), communication protocol limitations, additional security information, and the like. As described above, in an illustrative embodiment, the utilization of a hierarchical structure facilitates the association of policies and rules for groups of connected devices/users. Additionally, the service provider environment 120 can also identify keys and security information for maintaining the authentication and authorization information. For example, the security information can include policy-based expiration information.

At (4), the service provider environment 120 transmits the authentication and authorization information to the edge locations 140. Individual edge locations 140 store the authentication and authorization information or otherwise updates previously provided authentication and authorization information at (5). In illustrative embodiments, the authentication and authorization information can be encrypted in manner that can only be accessed by the coordinated device/user.

With reference to FIG. 6B, a second processing of requests will be described. Illustratively, a coordinated device 112 have received a request from one or more users to access the coordinated device 112 or coordinated device resources, such as via another computing device. Illustratively, the coordinated device 112 transmits the request to the coordinator 114. For example, the coordinate device may utilize the MQTT protocol to identify the request and provide information that can be utilized to evaluate the request, such as provided login, password, biometric information, etc. The interaction between the coordinated devices 112 and coordinator 114 may entail a number of communications.

In some embodiments, the coordinator 114 optionally determines whether the service provider environment 120 is available to receive and process requests (as described in FIG. 5). In one embodiment, the coordinator may look for network connectivity and the availability to securely transmit requests to the service provider environment 120. In other embodiments, the coordinator 114 may evaluate specific criteria, such as time of day, a number or state of computing devices (including the coordinator 114), information associated with the specific request (e.g., IP address, type of request, type of coordinated device 112, specific coordinated devices, etc.) that may define conditions for the coordinator 114 to be able to transmit request.

In the illustration of FIG. 6B, the coordinator 114 determines that the request can be processed by the service provider environment 120 based on the availability of network or evaluation of the rules provided by the service provider environment 120 and transmits the authentication and authorization request to the service provider environment 120. Illustratively, the request is received an edge location 140A based on networking protocols, such as Domain Name Service (DNS) in which logical and physical proximity can determine how requests are received. For example, the edge location can be based on latency requirements, network routing, and configuration of groups of edge locations 140 for that coordinated device 112.

At (2), the receiving edge location 140A of the service provider environment 120 can execute tasks related to evaluation of the received request and stored authentication and authorization information and generate a processing result. The processing result can illustratively include a denial of the request, an acceptance of the request, a generation of authorization tokens, a validation of offered tokens, a renewal of tokens, and the like. At (3), the service provider environment 120 transmits the processing result to the coordinator 114, which in turns returns the processing result to the coordinated device 112. As will be described in greater detail with regard to FIG. 8, in some embodiments, the receiving edge location 140A may not have the information required to fully process the authentication and authorization request. In this embodiment, as illustrated in FIG. 6B, the receiving edge location 140A may request information from the service provider environment 120 as needed.

Figure 7:
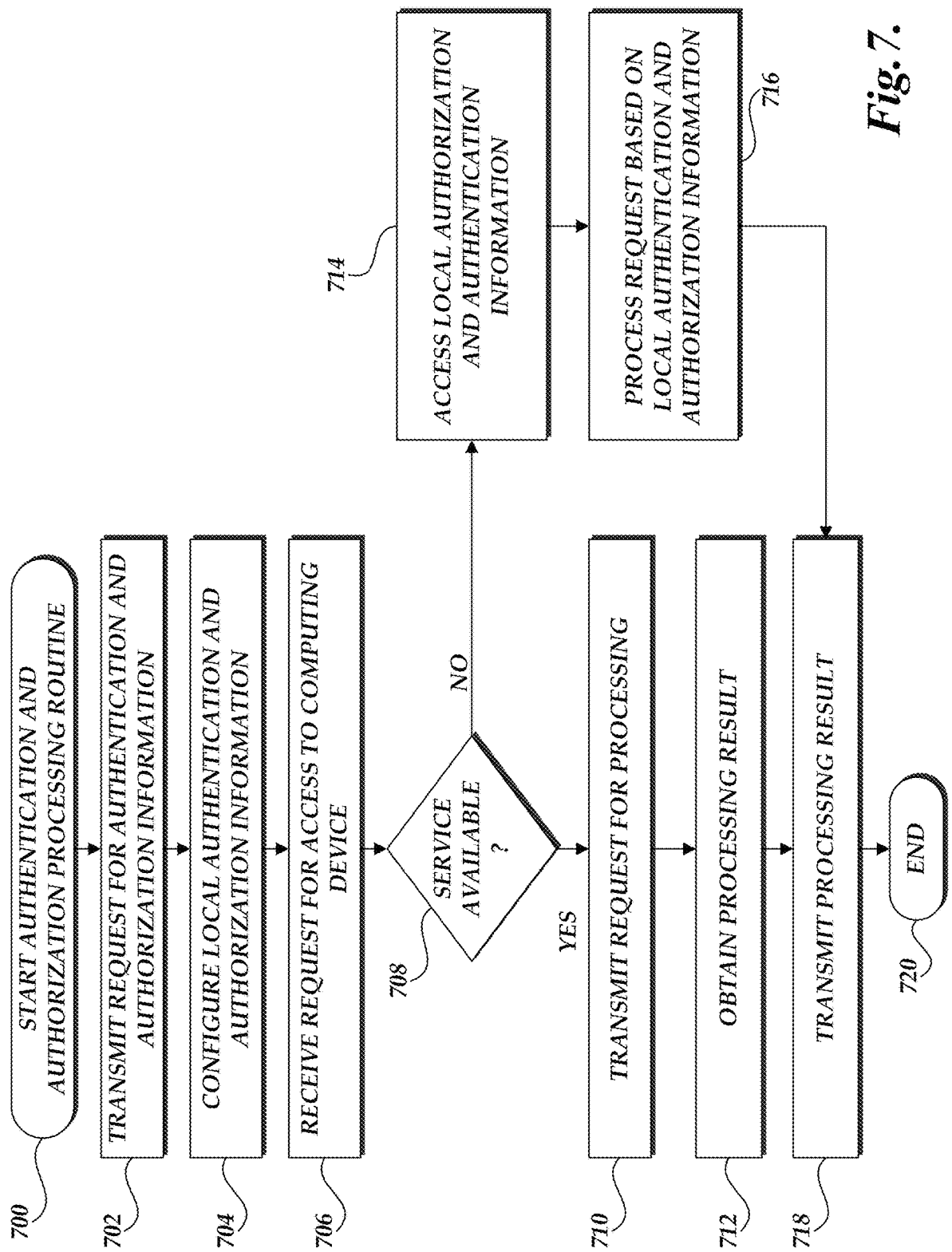
FIG. 7 is flow diagram illustrative of routine for receiving and processing local authentication and authorization information.

Turning now to FIG. 7, a routine 700 for processing requests for authentication and authorization will be described. Routine 700 will be illustratively described with regard to a coordinator 114. As previously indicated, the coordinator 114 may be configured in one embodiment to execute tasks related to receiving and maintaining authorization and authentication information and processing authentication and authorization requests from coordinated devices 112 to generate processing results. However, reference to interactions should not be limited to any particular device or combination of devices, even if used for illustrative purposes.

The initial configuration of a coordinated device 114 will be described. Illustratively, the service provider environment 120 coordinates individual coordinated devices 114 with information that facilitates the receipt of authorization and authentication information. Illustratively, the authorization and authentication information can correspond executable code that incorporates one or more rules, policies or logical steps to be able to receive requests for authorization or authentication of individual users attempting to access specific coordinate devices 112, resources associated or accessed by coordinated devices 112 or otherwise interact with coordinated devices 112. At block 702, the coordinator 114 transmits requests for local versions of authentication and authorization information maintained by the service provider environment 120. The request may be based on evaluating specific criteria, such as time criteria, receipt of a request, initiation by a system administrator, and the like.

Illustratively, the service provider environment 120 processes the request and identifies relevant authentication and authorization information. Illustratively, the service provider environment 120 can execute tasks or other executable code that can associated the coordinator 114 with one or more coordinated devices 112. For example, the service provider environment 120 can determine the set of users that are associated with coordinated devices 112 that are identified in the coordinator 114 request or otherwise known to be associated with the coordinator 114 (e.g., via configuration information). Illustratively, the authentication and authorization information can include secured information, such as electronic tokens or other data, that will be utilized to generate the processing results based on evaluation of requests. In some embodiments, the service provider environment 120 receives requests code utilizing an interface. The service provider environment 120 can validate that the set of users for the one or more coordinated devices 112 should be included in the local authorization and authentication information, such as by evaluating rules, logic, or established policies.

Additionally, the service provider environment 120 determines authentication and authorization parameters for the authentication and authorization information. Illustratively, the service provider environment 120 can associated various properties to the authentication and authorization information, such as time expirations, network limitation (e.g., the IP address from which requests will be processed), communication protocol limitations, additional security information, and the like. The service provider environment 120 transmits the authentication and authorization information to the coordinator 114. As described above, the relevant authentication and authorization information for the set of coordinated devices 112 may be organized in a hierarchical distribution. In this embodiment, the authentication and authorization information can have a highest level corresponding to a user pool of coordinated devices/users. The user pool can be subdivided into one or more intermediary nodes forming one or more levels of grouping of coordinated devices/users, generally referred to as groups or group nodes. Each group node can specify various policies and rules that are associated with all coordinated devices/users. At the lowest level of the hierarchy are end nodes that correspond to individual coordinated devices/users. Each end node corresponds to individual coordinated devices/users and specifies individual attributes of the coordinated device/user.

At block 704, the coordinator 114 stores the authentication and authorization information or otherwise updates previously provided authentication and authorization information. Illustratively, the service provider environment 120 can transmit updates with or without request, such as based on time or responsive to a determined update or expiration of the previously provided authentication and authorization information. In illustrative embodiments, the authentication and authorization information can be encrypted in manner that can only be accessed by the coordinated device/user.

At block 706, the coordinator 114 receives a request from a coordinated device 112. For example, the coordinate device may utilize the MQTT protocol to identify the request and provide information that can be utilized to evaluate the request, such as provided login, password, biometric information, etc. Depending on the type of request, the information included in the request can include identifiers, previously issued tokens, security information, and the like. The interaction between the coordinated devices 112 and coordinator 114 may entail a number of communications.

At decision block 708 the coordinator 114 determines whether the service provider environment 120 is available to receive and process requests. In one embodiment, the coordinator may look for network connectivity and the availability to securely transmit requests to the service provider environment 120. In other embodiments, the coordinator 114 may evaluate specific criteria, such as time of day, a number or state of computing devices (including the coordinator 114), information associated with the specific request (e.g., IP address, type of request, type of coordinated device 112, specific coordinated devices, etc.) that may define conditions for the coordinator 114 to be able to transmit request.

In one embodiment, the coordinator 114 determines that the request can be processed by the service provider environment 120 based on the availability of network or evaluation of the rules provided by the service provider environment 120 and at block 710, transmits the authentication and authorization request to the service provider environment 120. The on-demand code execution environment 150 of the service provider environment 120 can execute tasks related to evaluation of the received request and stored authentication and authorization information and generate a processing result. The processing result can illustratively include a denial of the request, an acceptance of the request, a generation of authorization tokens, a validation of offered tokens, a renewal of tokens, and the like. At block 712, the coordinator receives the processing results.

With reference again to decision block 708, if the coordinator 114 determines that the request cannot be processed by the service provider environment 120 based on the availability of network or evaluation of the rules provided by the service provider environment 120, at block 714, the coordinator 114 obtains local authentication and authorization information and at block 716, the coordinator can execute tasks related to evaluation of the received request and received authentication and authorization information and generate a processing result. The processing result can illustratively include a denial of the request, an acceptance of the request, a generation of authorization tokens, a validation of offered tokens, a renewal of tokens, and the like. At block 714, the coordinator 114 returns the processing result to the coordinated device 112. Routine 700 terminates at block 716.

Figure 8:
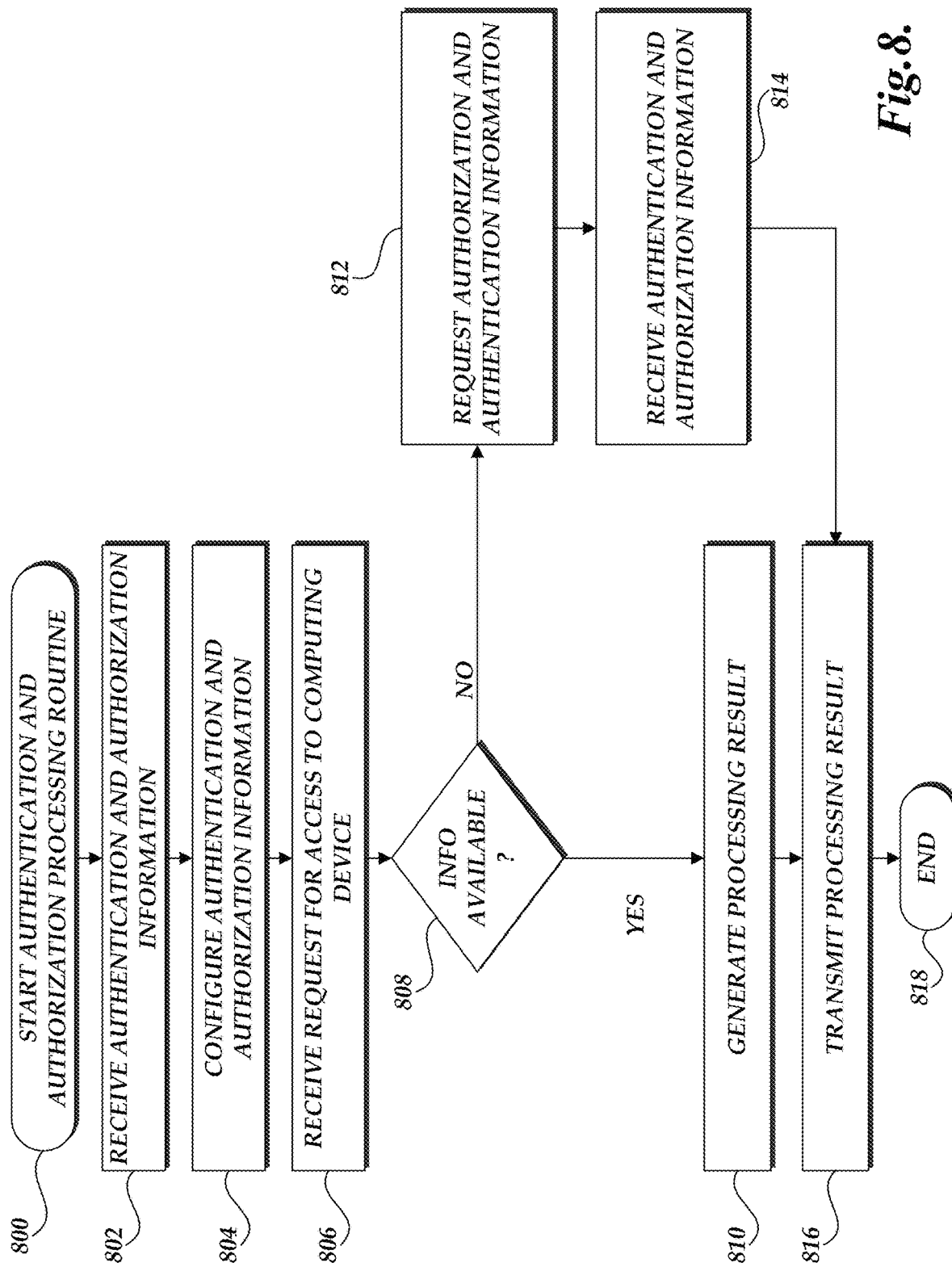
FIG. 8 is a flow diagram illustrative of a routine for receiving and processing authentication and authorization information in edge locations associated with a service provider.

Turning now to FIG. 8, a routine 800 for processing coordinated device 112 requests for authentication and authorization by edge locations 140 will be described. At block 802, the service provider environment 120 receives system administrator information to configure the edge components 140. Illustratively, the service provider environment 120 can execute tasks or other executable code that can associated the coordinator 114 with one or more coordinated devices 112. For example, the service provider environment 120 can determine the set of users that are associated with coordinated devices 112 that are identified in the coordinator 114 request or otherwise known to be associated with the coordinator 114 (e.g., via configuration information). Illustratively, the authentication and authorization information can include secured information, such as electronic tokens or other data, that will be utilized to generate the processing results based on evaluation of requests. In some embodiments, the message service provider environment 120 can obtain the requests code utilizing an interface. Additionally, the service provider environment 120 can receive information that associates pools of users to edge locations 140. For example, the edge locations can be associated with physical proximity to coordinators 114 or coordinated devices 112. The association may be individual edge location to a set of coordinated devices 112 or multiple edge location to the same set of coordinated devices. The service provider environment 120 can identify the relevant authentication and authorization information for each of the identified set of coordinated devices 112. Additionally, the service provider environment 120 determines authentication and authorization parameters for the authentication and authorization information. Illustratively, the service provider environment 120 can associated various properties to the authentication and authorization information, such as time expirations, network limitation (e.g., the IP address from which requests will be processed), communication protocol limitations, additional security information, and the like. As described above, the relevant authentication and authorization information for the set of coordinated devices 112 may be organized in a hierarchical distribution. In this embodiment, the authentication and authorization information can have a highest level corresponding to a user pool of coordinated devices/users. The user pool can be subdivided into one or more intermediary nodes forming one or more levels of grouping of coordinated devices/users, generally referred to as groups or group nodes. Each group node can specify various policies and rules that are associated with all coordinated devices/users. At the lowest level of the hierarchy are end nodes that correspond to individual coordinated devices/users. Each end node corresponds to individual coordinated devices/users and specifies individual attributes of the coordinated device/user.

At block 804, the edge location 140 stores the authentication and authorization information or otherwise updates previously provided authentication and authorization information. Illustratively, the authentication and authorization information can be encrypted in manner that can only be accessed by the coordinated device/user.

Additionally, a coordinated device 112 have received a request from one or more users to access the coordinated device 112 or coordinated device resources, such as via another computing device. As described in FIG. 6B, the coordinate device 112 transmits the request to the coordinator 114. For example, the coordinated device may utilize the MQTT protocol to identify the request and provide information that can be utilized to evaluate the request, such as provided login, password, biometric information, etc. The interaction between the coordinated devices 112 and coordinator 114 may entail a number of communications. The coordinator 114 optionally determines whether the service provider environment 120 is available to receive and process requests (as described in FIG. 5). In one embodiment, the coordinator may look for network connectivity and the availability to securely transmit requests to the service provider environment 120. In other embodiments, the coordinator 114 may evaluate specific criteria, such as time of day, a number or state of computing devices (including the coordinator 114), information associated with the specific request (e.g., IP address, type of request, type of coordinated device 112, specific coordinated devices, etc.) that may define conditions for the coordinator 114 to be able to transmit request.

The coordinator 114 determines that the request can be processed by the service provider environment 120 based on the availability of network or evaluation of the rules provided by the service provider environment 120 and transmits the authentication and authorization request to the service provider environment 120. At block 806, the edge location receives the request. Illustratively, the request is received an edge location 140A based on networking protocols, such as Domain Name Service (DNS) in which logical and physical proximity can determine how requests are received.

At decision block 808, the receiving edge location 140A of the service provider environment 120 can execute tasks related to evaluation of the received request and stored authentication and authorization information and generate a processing result at block 810. At block 808, the determination can include a determination of whether the edge location has the appropriate authentication and authorization information. If the information is not available, at block 812, the edge location 140 transmits a request and receives the information form the service provider environment 120. The processing result can illustratively include a denial of the request, an acceptance of the request, a generation of authorization tokens, a validation of offered tokens, a renewal of tokens, and the like.

At block 816, the service provider environment 120 transmits the processing result to the coordinator 114, which in turns returns the processing result to the coordinated device 112. Routine 800 terminates at block 818.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing access to computing devices comprising:
   at least one coordinated device having a first processor and a first memory, the at least one coordinated device configured to transmit requests to access computing device local resources associated with the at least one coordinated device, wherein individual requests require processing result based on evaluation of authentication and authorization information and wherein the at least one coordinated device is associated with limited functionality that cannot authenticate requests to access the computing device resources; and,
   a coordinator service having a second processor and a second memory, wherein the coordinator service is configured to:
     receive a request from the at least one coordinated device for accessing the computing device resources associated with the at least one coordinated device;
     determine service availability for a network-based service for processing the received request based on at least one of network connectivity, availability of secure transmissions, and criteria defining conditions for the coordinator service to transmit requests to the network-based service;
     evaluate local authentication and authorization information based on unavailability of the network-based service;
     generate a processing result regarding the evaluation of the local authentication and authorization information; and
     transmit the processing result responsive to the received request to the at least one coordinated device.

2. The system as recited in claim 1, wherein the coordinator service is further configured to:
   transmit a request for accessing the computing device resources to the network-based service based on a determination of service availability; and
   receive a processing result regarding evaluation of authorization and authentication information from the network-based service.

3. The system as recited in claim 1, wherein the coordinator service is further configured to:
   transmit a request for the local authorization and authentication information to the network-based service;
   receive the requested authorization and authentication information; and
   encrypt the requested authorization and authentication information based on a user key.

4. The system as recited in claim 3, wherein the received authorization and authentication information includes expiration information.

5. The system as recited in claim 1, wherein evaluating the local authentication and authorization information based on unavailability of the network-based service includes evaluating expiration information.

6. A method for managing computing devices comprising:
   receiving, at a coordinator device, a request from a coordinated device for accessing local computing device resources associated with the coordinated device;
   evaluating, at the coordinator device, local authentication and authorization information based on unavailability of a network-based service, wherein the unavailability is based on one or more of network connectivity, availability of secure transmissions, and criteria defining conditions for the coordinator device to transmit requests to the network-based service;

generating, at the coordinator device, a processing result regarding the evaluation of the local authentication and authorization information; and transmitting, by the coordinator device, the processing result responsive to the received request.

7. The method as recited in claim 6 further comprising determining network-based service availability based on at least one policy.

8. The method as recited in claim 7 further comprising transmitting a request for authentication and authorization based on the determination of network-based service availability.

9. The method as recited in claim 6 further comprising:

transmitting a request for authorization and authentication information to the network-based service;

receiving the requested authorization and authentication information.

10. The method as recited in claim 9, wherein the requested authorization and authentication information includes processing information.

11. The method as recited in claim 10, wherein the processing information includes expiration information.

12. The method as recited in claim 10, wherein the processing information includes service availability determination criteria.

13. The method as recited in claim 9, wherein the requested authorization and authentication information is associated with a hierarchical structure defining individual users and one or more associated groups.

14. The method as recited in claim 9, wherein the requested authorization and authentication information is encrypted.

15. The method as recited in claim 6, wherein the processing result includes an authentication token.

16. The method as recited in claim 6, wherein the processing result includes at least one of an authentication token validation or an authentication token renewal.

17. The method as recited in claim 6, wherein the processing result include an authentication token renewal.

18. A method for managing computing devices comprising:

receiving, at a coordinator device, a request for accessing computing device resources associated with a coordinated device, wherein the coordinator device is independent of the coordinated device and a network-based authentication service;

determining, at the coordinator device, availability of the network-based authentication service based on at least one of network connectivity, availability of secure transmissions, and criteria defining conditions for transmission of the request to the network-based authentication service; and determining, at the coordinator device, to process the request using local authentication and authorization information based on unavailability of the network-based authentication service.

19. The method as recited in claim 18 further comprising transmitting a request for authentication and authorization based on a determination of network-based authentication service availability.

20. The method as recited in claim 19, wherein the requested authorization and authentication information includes processing information including at least one of expiration information or service availability determination criteria.

21. The method as recited in claim 18 further comprising:

transmitting a request for authorization and authentication information to the network-based authentication service; and receiving the requested authorization and authentication information.

22. The method as recited in claim 18, further comprising generating a processing result, wherein the processing result includes at least one of an authentication token, an authentication token validation, or an authentication token renewal.

* * * * *